(12) United States Patent
Lamere et al.

(10) Patent No.: US 12,277,178 B2
(45) Date of Patent: *Apr. 15, 2025

(54) MEDIA CONTENT ITEM RECOMMENDATION SYSTEM

(71) Applicant: Spotify AB, Stockholm (SE)

(72) Inventors: Paul Lamere, Boston, MA (US); Jonathan Marmor, New York, NY (US); Michelle Ackerman, Boston, MA (US); Per Lindstrand, Gothenburg (SE); Oscar Söderlund, Gothenburg (SE); Mattias Johansson, Gothenburg (SE); Jacob Colin Waller, Gothenburg (SE); Felipe Oliveira Carvalho, Gothenburg (SE); Camilla Westraeus, Gothenburg (SE); Michael Öhman, Gothenburg (SE)

(73) Assignee: Spotify AB, Stockholm (SE)

( * ) Notice: Subject to any disclaimer, the term of this patent is extended or adjusted under 35 U.S.C. 154(b) by 0 days.

This patent is subject to a terminal disclaimer.

(21) Appl. No.: 18/322,209

(22) Filed: May 23, 2023

(65) Prior Publication Data

US 2023/0418872 A1     Dec. 28, 2023

Related U.S. Application Data

(63) Continuation of application No. 17/369,707, filed on Jul. 7, 2021, now Pat. No. 11,698,932, which is a continuation of application No. 15/858,377, filed on Dec. 29, 2017, now Pat. No. 11,086,936.

(60) Provisional application No. 62/441,035, filed on Dec. 30, 2016.

(51) Int. Cl.
| | | |
|---|---|---|
| *G06F 16/9032* | (2019.01) | |
| *G06F 16/435* | (2019.01) | |
| *G06F 16/438* | (2019.01) | |

(52) U.S. Cl.
CPC ...... *G06F 16/90324* (2019.01); *G06F 16/435* (2019.01); *G06F 16/4387* (2019.01)

(58) Field of Classification Search
CPC ............ G06F 16/90324; G06F 16/435; G06F 16/4387
USPC ...................................................... 707/749
See application file for complete search history.

(56) References Cited

U.S. PATENT DOCUMENTS

| | | |
|---|---|---|
| 7,678,984 B1 | 3/2010 | Lamere |
| 8,180,770 B2 | 5/2012 | Ranasinghe |
| 10,055,493 B2 | 8/2018 | Heitz, III |
| 10,268,960 B2 * | 4/2019 | Yao ................... G06N 5/022 |
| 11,086,936 B2 | 8/2021 | Lamere |
| 2003/0221541 A1 | 12/2003 | Platt |
| 2006/0195516 A1 | 8/2006 | Beaupre |
| 2006/0265421 A1 | 11/2006 | Ranasinghe |
| 2007/0025194 A1 | 2/2007 | Morse |
| 2007/0088727 A1 | 4/2007 | Kindig |
| 2007/0089057 A1 | 4/2007 | Kindig |
| 2007/0168388 A1 | 7/2007 | Plastina |

(Continued)

*Primary Examiner* — Cam Linh T Nguyen
(74) *Attorney, Agent, or Firm* — McDonnell Boehnen Hulbert & Berghoff LLP

(57) ABSTRACT

A media content item recommendation system recommends media content items based on one or more attributes of a seed playlist. The recommended media content items can be determined from a plurality of existing playlists that have been created over a period of time. Such existing playlists can be selected based on similarity to the seed playlist.

20 Claims, 31 Drawing Sheets

(56) References Cited

U.S. PATENT DOCUMENTS

| | | |
|---|---|---|
| 2008/0115173 A1 | 5/2008 | Ellis |
| 2008/0257134 A1 | 10/2008 | Oppenheimer |
| 2009/0056525 A1 | 3/2009 | Oppenheimber |
| 2009/0327349 A1 | 12/2009 | Fukuda |
| 2010/0070917 A1 | 3/2010 | Gates |
| 2010/0088327 A1 | 4/2010 | Holm |
| 2011/0208750 A1 | 8/2011 | Miyazaki |
| 2011/0295843 A1 | 12/2011 | Ingrassia, Jr. |
| 2013/0031216 A1 | 1/2013 | Willis et al. |
| 2013/0262458 A1 | 10/2013 | Saito |
| 2013/0311491 A1 | 11/2013 | Fukuda |
| 2014/0074846 A1 | 3/2014 | Moss |
| 2014/0149468 A1 | 5/2014 | Lu et al. |
| 2015/0039644 A1 | 2/2015 | Trivedi |
| 2015/0213018 A1 | 7/2015 | Sanio |
| 2016/0147767 A1 | 5/2016 | Manning |
| 2016/0299906 A1 | 10/2016 | Cartoon |
| 2017/0351767 A1 | 12/2017 | Suzuki |
| 2017/0358302 A1 | 12/2017 | Orr |

\* cited by examiner

FIG. 21

PLAYLIST
soft rock
Created by: ljoan7 - 2 songs, 10 min

FOLLOWERS
0

(PLAY) (—)                                    Available Offline ⊙

Q Filter

| SONG | ARTIST | ALBUM | | |
|---|---|---|---|---|
| + If You Leave Me Now - Remastered | Chicago | Chicago X | 4 days ago | 3:55 |
| ✓ Hotel California | Eagles | Hotel California (Remastered) | 4 days ago | 6:31 |

Recommended Songs ▲
Based on the songs in this playlist                                    (REFRESH)

| | | | | |
|---|---|---|---|---|
| (ADD) Dust in the Wind | Kansas | Point Of Know Return ... | 3:26 |
| (ADD) I Want To Know What Love Is - Rem... | Foreigner | Agent Provocateur | 5:05 |
| (ADD) How Deep Is Your Love (2007 Rema... | Bee Gees | Saturday Night Fever [The Original M. | 4:05 |
| (ADD) A Horse with No Name | America | America | 4:12 |
| (ADD) Every Breath You Take - 2003 Stere... | The Police | Synchronicity (Remastered) | 4:13 |
| (ADD) Africa | Toto | Toto IV | 4:56 |

70s Disco

| 1 | Stayin' Alive (Remastered Album Version) | Bee Gees |
|---|---|---|
| 2 | Good Times | CHIC |
| 3 | You Make Me Feel (Mighty Real) | Sylvester |
| 4 | More, More, More | Andrea True Connection |
| 5 | Daddy Cool | Boney M. |
| 6 | He's The Greatest Dancer | Sister Sledge |
| 7 | Heaven Must Be Missing An Angel | Tavares |
| 8 | Hot Stuff | Donna Summer |
| 9 | Celebration - Single Version | Kool & The Gang |
| 10 | You Sexy Thing | Hot Chocolate |

FIG. 22

Italian Dinner — Italian Restaurant Music of Italy

| # | Song | Artist |
|---|---|---|
| 1 | Cinbiribin | |
| 2 | Ma l'amore no | Alberto Rabagliati |
| 3 | Vedrai, Vedrai | Luigi Tenco |
| 4 | Come Back To Sorrento | Dean Martin |
| 5 | Fly Me To The Moon - Remastered 2008 | Frank Sinatra |
| 6 | Buona Sera - 1991 Digital Remaster | Louis Prima |
| 7 | Firenze Sogna | Carlo Buti |
| 8 | Scalinatella | Claudio Villa |
| 9 | Guarda che luna | Fred Buscaglione |
| 10 | Ho La Testa Come Un Pallone | Marino Marini |

Break up

420 —

| | | |
|---|---|---|
| 1 | Irreplaceable | Beyoncé |
| 2 | Someone Like You | Adele |
| 3 | Since U Been Gone | Kelly Clarkson |
| 4 | When I Was Your Man | Bruno Mars |
| 5 | Cry Me a River | Justin Timberlake |
| 6 | The Scientist | Coldplay |
| 7 | Jar of Hearts | Christina Perri |
| 8 | Somebody That I Used To Know | Gotye |
| 9 | Too Little, Too Late | JoJo |
| 10 | Say Something | A Great Big World |

Music — 420

| | | |
|---|---|---|
| 1 | How Deep Is Your Love | Calvin Harris |
| 2 | What Do You Mean? | Justin Bieber |
| 3 | 679 (feat. Remy Boyz) | Fetty Wap |
| 4 | Locked Away | R. City |
| 5 | Where Are Ü Now (with Justin Bieber) | Jack Ü |
| 6 | Drag Me Down | One Direction |
| 7 | See You Again (feat. Charlie Puth) | Wiz Khalifa |
| 8 | Stole the Show | Kygo |
| 9 | Can't Feel My Face | The Weeknd |
| 10 | Waiting For Love | Avicii |

Title: 'playlist'
Seeds: Disturbia (Rhianna), Werewolves of London (Warren Zevon), Thriller (Michael Jackson)

| # | Song | Artist |
|---|---|---|
| 1 | Superstition | Stevie Wonder |
| 2 | Thriller | Michael Jackson |
| 3 | (Don't Fear) The Reaper | Blue Oyster Cult |
| 4 | Ghostbusters | Ray Parker, Jr. |
| 5 | Time Warp | Patricia Quinn |
| 6 | Highway to Hell | AC/DC |
| 7 | This Is Halloween | The Citizens of Halloween |
| 8 | Howlin' For You | The Black Keys |
| 9 | Bad Moon Rising | Creedence Clearwater Revival |
| 10 | Hungry Like The Wolf | Duran Duran |

FIG. 26

Title: playlist
Seeds: All along the watchtower (Jimi Hendrix), Piece of my heart (Janis Joplin), White Rabbit (Jefferson airplane)

| # | Song | Artist |
|---|------|--------|
| 1 | Somebody to Love | Jefferson Airplane |
| 2 | For What It's Worth | Buffalo Springfield |
| 3 | The House Of The Rising Sun | The Animals |
| 4 | Break On Through (To The Other Side) | The Doors |
| 5 | Like a Rolling Stone | Bob Dylan |
| 6 | People Are Strange | The Doors |
| 7 | Going Up The Country | Canned Heat |
| 8 | Gimme Shelter | The Rolling Stones |
| 9 | Happy Together | The Turtles |
| 10 | Stairway To Heaven | Led Zeppelin |

FIG. 27

Title: 'playlist'
Seeds: War Pigs (Cake), Such Great Heights (Iron & Wine), Come on Eileen (Save Ferris)
(hipster results)

| # | Song | Artist |
|---|------|--------|
| 1 | I Will Survive | Cake |
| 2 | The World Is New | Save Ferris |
| 3 | Brown Eyed Girl - Best Of | Reel Big Fish |
| 4 | A Case Of You | Michelle Branch |
| 5 | Uptown Girl | Me First and the Gimme Gimmes |
| 6 | Crazy | Violent Femmes |
| 7 | It's Not Unusual | Five Iron Frenzy |
| 8 | Personal Jesus | Marilyn Manson |
| 9 | American Pie | Catch 22 |
| 10 | 99 Red Balloons | Goldfinger |

FIG. 28

Seed: Your Favorite Coffeehouse

| | | |
|---|---|---|
| 1 | Breaking | Christopher Jak |
| 2 | Pacing The Cage | Bruce Cockburn |
| 3 | Naked As We Came | Iron & Wine |
| 4 | Homesick | Kings of Convenience |
| 5 | Heartbeats | José González |
| 6 | Come Home | Ryan Adams |
| 7 | Same As the Sun | Jesse Cole |
| 8 | Big Black Car | Gregory Alan Isakov |
| 9 | Stand Still, Look Pretty | The Wreckers |
| 10 | Sleepy Little Town | The White Buffalo |

FIG. 29

Seed: Acoustic Covers

| | | |
|---|---|---|
| 1 | Sweet Child O' Mine | Taken By Trees |
| 2 | How Deep Is Your Love | the bird and the bee |
| 3 | Hallelujah | Jeff Buckley |
| 4 | Rocket Man | My Morning Jacket |
| 5 | Smells Like Teen Spirit - Radio Edit | Patti Smith |
| 6 | Lovesong | Adele |
| 7 | How's It Going to Be | Jack and White |
| 8 | My Neck, My Back - Live | Elle King |
| 9 | Wherever, Wherever | Mundy |
| 10 | Everybody Hurts - MTV Unplugged Version | The Corrs |

FIG. 30

Metal Goddesses

| | | |
|---|---|---|
| 1 | The Edge Of Infinity | Lunatica |
| 2 | Amaranthine | Amaranthe |
| 3 | No More | Nemesea |
| 4 | The Haunting (Somewhere In Time) | Kamelot |
| 5 | Venus | Theatre Of Tragedy |
| 6 | I Miss The Misery | Halestorm |
| 7 | I Walk Alone - Album Version Single Cut | Tarja |
| 8 | All Systems Go | Krypteria |
| 9 | Nightmare | Avenged Sevenfold |
| 10 | Son Of the Staves Of Time | Therion |

FIG. 31

MEDIA CONTENT ITEM RECOMMENDATION SYSTEM

CROSS-REFERENCE TO RELATED APPLICATION(S)

This application is a continuation of U.S. application Ser. No. 17/369,707, filed Jul. 7, 2021, which is a continuation of U.S. application Ser. No. 15/858,377, filed Dec. 29, 2017, issued as U.S. Pat. No. 11,086,936, which claims the benefit of U.S. Provisional Application No. 62/441,035 filed on Dec. 30, 2016, each of which are hereby incorporated by reference in their entireties. To the extent appropriate, a claim of priority is made to each of the above disclosed applications.

BACKGROUND

People enjoy consuming media content, such as listening to audio content or watching video content. Examples of audio content include songs, albums, podcasts, and audiobooks. Examples of video content include movies, music videos, and television episodes. Using a mobile phone or other media-playback device a person can access large catalogs of media content. For example, a user can access an almost limitless catalog of media content through various free and subscription-based streaming services. Additionally, a user can store a large catalog of media content on his or her mobile device.

Playlists are typically used to manage and save a list of media content items that users want to consume. However, nearly limitless access to media content introduces several challenges for users who use playlists. For example, it may be difficult to find or select the right media content elements that a user wants to add to a particular playlist.

SUMMARY

In general terms, this disclosure is directed to a media content item recommendation system. In one possible configuration and by non-limiting example, the system operates to recommend media content items based on at least one attribute of a seed playlist. Various aspects are described in this disclosure, which include, but are not limited to, the following aspects.

One aspect is a method for recommending media content items for a playlist. The method includes: identifying, using at least one computing device, a plurality of existing playlists from a playlist database; obtaining, using at least one computing device, at least one attribute of the playlist; comparing, using the at least one computing device, the at least one attribute of the playlist with at least one attribute of each of the plurality of existing playlists; calculating, using the at least one computing device, similarity scores based on the comparison; and determining, using the at least one computing device, one or more recommended media content items from the plurality of existing playlists based on the similarity scores.

Another aspect is a method of recommending media content items for a seed playlist. The method includes: generating a user interface on a computing device, the user interface including a playlist section and a media recommendation section; displaying at least one attribute of the seed playlist in the playlist section of the user interface; displaying a list of recommended media content items in the media recommendation section of the user interface; and enabling a user to add at least one of the recommended media content items to the seed playlist.

Yet another aspect is a system for recommending media content items for a seed playlist. The system includes a processing device; a playlist database storing a plurality of playlists; and a computer readable data storage medium storing software instructions that, when executed by the processing device, cause the system to: determine a plurality of preliminary candidate playlists from the plurality of playlists stored in the playlist database; compare the seed playlist with each of the plurality of preliminary candidate playlists; calculate similarity scores based on the comparison; determine a plurality of candidate playlists from the plurality of preliminary candidate playlists based on the similarity scores; aggregate candidate media content items from the plurality of candidate playlists; determine one or more recommended media content items from the candidate media content items; transmit information about the recommended media content items to a media-playback device, the media-playback device displaying at least one of the recommended media content items and providing a user interface for updating the seed playlist with the recommended media content items.

BRIEF DESCRIPTION OF THE DRAWINGS

FIG. 21 illustrates an example of the user interface showing an example media playlist interface and an example recommendation interface.

FIG. 22 illustrates an example recommendation of media content items where the seed playlist has a playlist title without tracks.

FIG. 23 illustrates another example recommendation of media content items where the seed playlist has a playlist title without tracks.

FIG. 24 illustrates yet another example recommendation of media content items where the seed playlist has a playlist title without tracks.

FIG. 25 illustrates yet another example recommendation of media content items where the seed playlist has a playlist title without tracks.

FIG. 26 illustrates an example recommendation of media content items where the seed playlist has a generic playlist title and only a limited number of seed tracks.

FIG. 27 illustrates another example recommendation of media content items where the seed playlist has a generic playlist title and only a limited number of seed tracks.

FIG. 28 illustrates yet another example recommendation of media content items where the seed playlist has a generic playlist title and only a limited number of seed tracks.

FIG. 29 illustrates an example recommendation of media content items where the seed playlist has a descriptive playlist title and a sufficient number of seed tracks.

FIG. 30 illustrates another example recommendation of media content items where the seed playlist has a descriptive playlist title and a sufficient number of seed tracks.

FIG. 31 illustrates yet another example recommendation of media content items where the seed playlist has a descriptive playlist title and a sufficient number of seed tracks.

DETAILED DESCRIPTION

Figure 1:
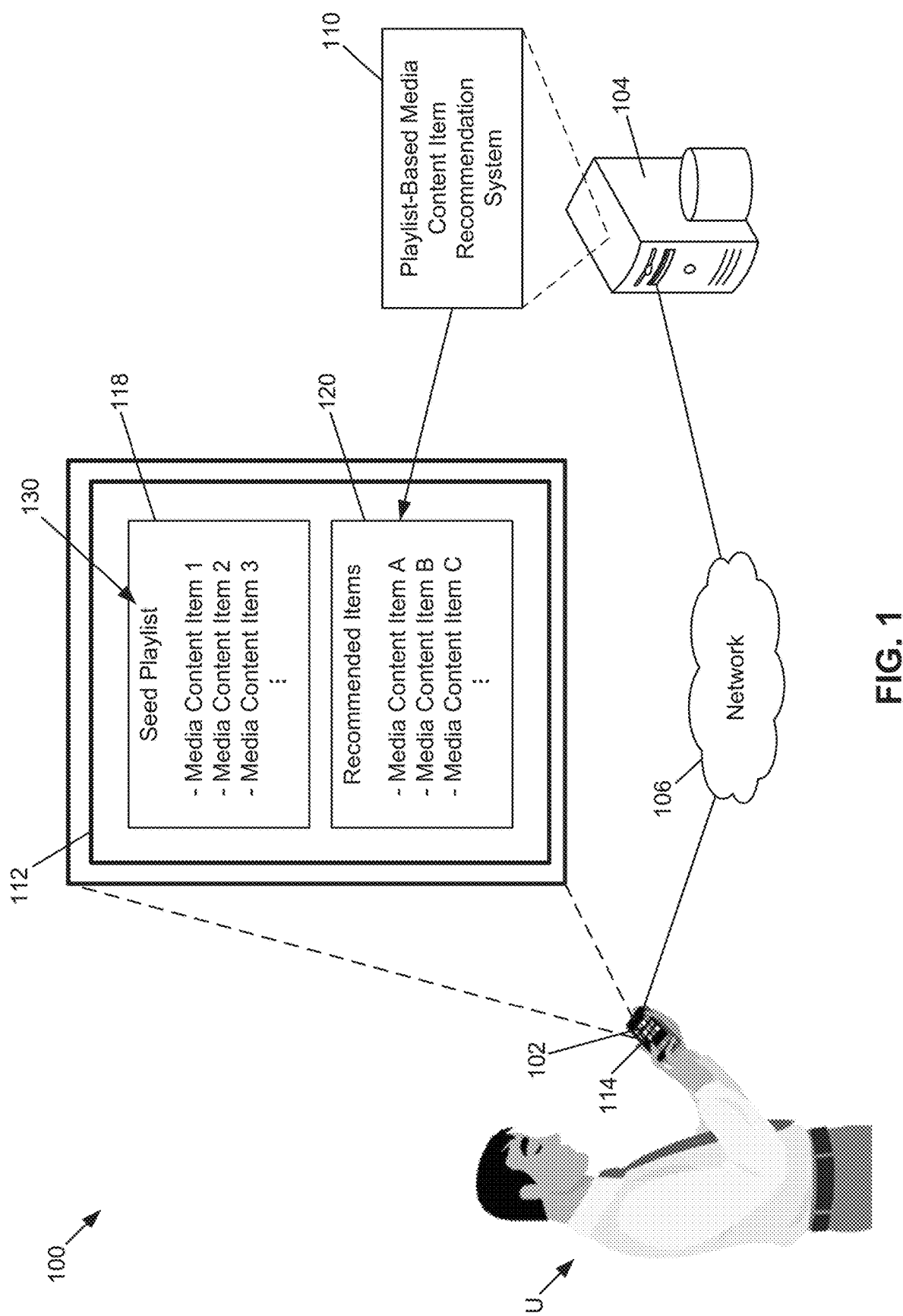
FIG. 1 illustrates an example system for recommending one or more media content items for a media content playlist.

Various embodiments will be described in detail with reference to the drawings, wherein like reference numerals represent like parts and assemblies throughout the several views.

In general, a media content item recommendation system of the present disclosure generates a list of recommended media content items based on at least one attribute of a seed playlist. The recommended media content items can be determined from a plurality of existing playlists that have been created over a period of time. Such existing playlists can be selected based on similarity to the seed playlist.

In some embodiments, the system operates to enable a user to create a playlist with a brief description about the playlist, such as a playlist title. The user description of the playlist can be used to recommend one or more media content items. For example, the playlist title provided by a user is used to generate a list of recommended media content items that can be described by the playlist title so that the user selects one or more media content items from the list and add them to the playlist.

In addition, or alternatively, one or more media content items already included in a playlist can be evaluated to recommend media content items to be added in the playlist. One or more attributes of the media content items that have already been saved in the playlist can be considered to recommend other media content items that are similar to the attributes of the existing media content items.

FIG. 1 illustrates an example system 100 for recommending one or more media content items that can be added to a media content playlist. The example system 100 includes a media-playback device 102 and a media-delivery system 104. The system 100 communicates across a network 106. A playlist-based media content item recommendation system 110 runs on the media-delivery system 104. Also shown are a user U who uses the media-playback device 102, and a user interface 112 presented to the user U via an output device 114 of the media-playback device 102. The user interface 112 includes a media playlist interface 118 and a media recommendation interface 120.

The media-playback device 102 operates to play media content items to produce media output 108 (FIG. 2) in one or more formats, such as audible, visible, and tactile outputs. In some embodiments, the media content items are provided by the media-delivery system 104 and transmitted to the media-playback device 102 using the network 106. A media content item is an item of media content, including audio, video, or other types of media content, which may be stored in any format suitable for storing media content. Non-limiting examples of media content items include songs, albums, music videos, movies, television episodes, podcasts, other types of audio or video content, and portions or combinations thereof.

The media-delivery system 104 operates to store and manage media content items. The media-delivery system 104 also can operate to transmit media content items to the media-playback device 102 via the network 106. Examples of the media-playback device 102, the media-delivery system 104, and the network 106 are further described with reference to FIG. 2.

The playlist-based media content item recommendation system 110 operates to recommend one or more media content items to the user. In some embodiments, the recommendation system 110 generates a list of recommended media content items based on at least one attribute of a seed playlist which the user has created. The recommended media content items can be determined from a plurality of existing playlists that have been created over a period of time. Such existing playlists can be selected based on similarity to the seed playlist. An example of the recommendation system 110 is described in more detail with reference to FIG. 4.

In some embodiments, the media-playback device 102 includes the output device 114, such as a display screen, to present the user interface 112 with which the user can operate the media-playback device 102 to play back media content items, manage playlists, and use other functions. In some embodiments, the user interface 112 includes a media playlist interface 118 and a media recommendation interface 120.

The media playlist interface 118 is configured to present a playlist that the user selected to review or play back the media content items identified in the playlist. In some embodiments, the playlist presented in the media playlist interface 118 can be used as a seed playlist 130 which is used for the recommendation system 110 to provide recommended media content items.

The media recommendation interface 120 is configured to present one or more recommended media content items that are found and provided by the recommendation system 110.

The seed playlist 130 is a playlist which is used as a basis to provide recommendation of media content items. In some embodiments, the seed playlist 130 is created by a user using the media-playback device 102 or other computing devices. The seed playlist 130 includes a user-defined description of the seed playlist 130, such as a playlist title, which can be used by the recommendation system 110. An example of the seed playlist 130 is described in more detail with reference to FIGS. 9-11.

Figure 2:
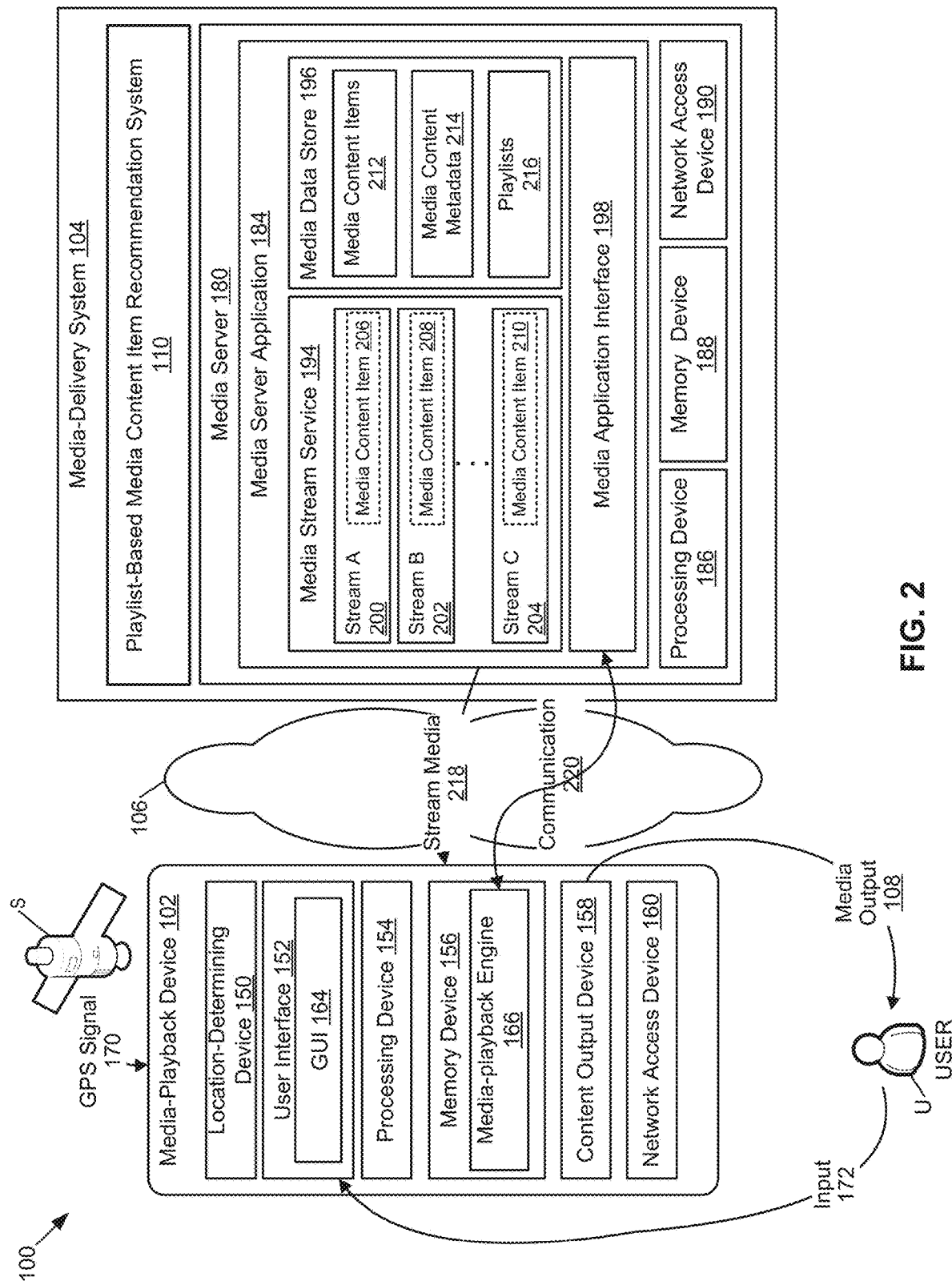
FIG. 2 is a schematic illustration of an example system for providing a media recommendation list for a media content playlist.

FIG. 2 is a schematic illustration of an example system 100 for providing a media recommendation list for a media playlist, such as a seed playlist 130. In the illustrated example, the media-playback device 102, the media-delivery system 104, and the network 106 are shown. Also shown are the user U and a satellite S.

As noted above, the media-playback device 102 operates to play media content items. In some embodiments, the media-playback device 102 operates to play media content items that are provided (e.g., streamed, transmitted, etc.) by a system external to the media-playback device such as the media-delivery system 104, another system, or a peer device. Alternatively, in some embodiments, the media-playback device 102 operates to play media content items stored locally on the media-playback device 102. Further, in at least some embodiments, the media-playback device 102 operates to play media content items that are stored locally as well as media content items provided by other systems.

In some embodiments, the media-playback device 102 is a computing device, handheld entertainment device, smartphone, tablet, watch, wearable device, or any other type of device capable of playing media content. In yet other embodiments, the media-playback device 102 is a laptop computer, desktop computer, television, gaming console, set-top box, network appliance, blue-ray or DVD player, media player, stereo, or radio.

In at least some embodiments, the media-playback device 102 includes a location-determining device 150, a user interface 152, a processing device 154, a memory device 156, a content output device 158, and a network access device 160. Other embodiments may include additional, different, or fewer components. For example, some embodiments may include a recording device such as a microphone or camera that operates to record audio or video content.

The location-determining device 150 is a device that determines the location of the media-playback device 102. In some embodiments, the location-determining device 150 uses one or more of the following technologies: Global Positioning System (GPS) technology which may receive GPS signals 170 from satellites S, cellular triangulation technology, network-based location identification technology, Wi-Fi positioning systems technology, and combinations thereof.

The user interface 152 operates to receive an input 172 from a selector (e.g., a finger, stylus etc.) controlled by the user U. In some embodiments, the user interface includes a touch sensitive display screen that operates as both a display device and a user input device. In some embodiments, the touch screen detects inputs based on one or both of touches and near-touches. In some embodiments, the user interface 152 includes a graphical user interface 164, which is displayed on a display screen of the media-playback device 102, for interacting with the media-playback device 102. As noted above, some embodiments do not include a touch screen. Some embodiments include a display device and one or more separate user interface devices. Further, some embodiments do not include a display device.

In some embodiments, the processing device 154 comprises one or more central processing units (CPU). In other embodiments, the processing device 154 additionally or alternatively includes one or more digital signal processors, field-programmable gate arrays, or other electronic circuits.

The memory device 156 operates to store data and instructions. In some embodiments, the memory device 156 stores instructions for a media-playback engine 166. The memory device 156 typically includes at least some form of computer-readable media. Computer readable media include any available media that can be accessed by the media-playback device 102. By way of example, computer-readable media include computer readable storage media and computer readable communication media.

Computer readable storage media includes volatile and nonvolatile, removable and non-removable media implemented in any device configured to store information such as computer readable instructions, data structures, program modules, or other data. Computer readable storage media includes, but is not limited to, random access memory, read only memory, electrically erasable programmable read only memory, flash memory and other memory technology, compact disc read only memory, blue ray discs, digital versatile discs or other optical storage, magnetic cassettes, magnetic tape, magnetic disk storage or other magnetic storage devices, or any other medium that can be used to store the desired information and that can be accessed by the media-playback device 102. In some embodiments, computer readable storage media is non-transitory computer readable storage media.

Computer readable communication media typically embodies computer readable instructions, data structures, program modules or other data in a modulated data signal such as a carrier wave or other transport mechanism and includes any information delivery media. The term "modulated data signal" refers to a signal that has one or more of its characteristics set or changed in such a manner as to encode information in the signal. By way of example, computer readable communication media includes wired media such as a wired network or direct-wired connection, and wireless media such as acoustic, radio frequency, infrared, and other wireless media. Combinations of any of the above are also included within the scope of computer readable media.

The content output device 158 operates to output media content. In some embodiments, the content output device 158 generates media output 108 for the user U. Examples of the content output device 158 include a speaker, an audio output jack, a Bluetooth transmitter, a display panel, a video output jack, and a haptic actuator. Other embodiments are possible as well. For example, the content output device 158 may transmit a signal through the audio output jack or Bluetooth transmitter that can be used to reproduce an audio signal by a connected or paired device such as headphones or a speaker, which can be connected via various types of connectors. Examples of such connectors include a USB connector and a USB-C connector.

The network access device 160 operates to communicate with other computing devices over one or more networks, such as the network 106. Examples of the network access device include wired network interfaces and wireless network interfaces. Wireless network interfaces includes infrared, BLUETOOTH® wireless technology, 802.11a/b/g/n/ac, and cellular or other radio frequency interfaces in at least some possible embodiments.

The media-playback engine 166 operates to play back one or more of the media content items (e.g., music). In some embodiments, the media-playback engine 166 is configured to communicate with the media-delivery system 104 to receive one or more media content items (e.g., through the stream media 218). In other embodiments, the media-playback engine 166 is configured to playback one or more media content items that are locally stored in the media-playback device 102.

The network 106 is an electronic communication network that facilitates communication between the media-playback device 102 and the media-delivery system 104. An electronic communication network includes a set of computing devices and links between the computing devices. The computing devices in the network use the links to enable communication among the computing devices in the network. The network 106 can include routers, switches, mobile access points, bridges, hubs, intrusion detection devices, storage devices, standalone server devices, blade server devices, sensors, desktop computers, firewall devices, laptop computers, handheld computers, mobile telephones, and other types of computing devices.

In various embodiments, the network 106 includes various types of links. For example, the network 106 can include wired and/or wireless links, including Bluetooth, ultra-wideband (UWB), 802.11, ZigBee, cellular, and other types of wireless links. Furthermore, in various embodiments, the network 106 is implemented at various scales. For example, the network 106 can be implemented as one or more local area networks (LANs), metropolitan area networks, subnets, wide area networks (such as the Internet), or can be implemented at another scale. Further, in some embodiments, the network 106 includes multiple networks, which may be of the same type or of multiple different types.

Referring still to FIG. 2, the media-delivery system 104 comprises one or more computing devices and operates to provide media content items to the media-playback devices 102 and, in some embodiments, other media-playback devices as well. The media-delivery system 104 includes a media server 180. In at least some embodiments, the media server 180 is provided by multiple computing devices. For example, the media server 180 may be provided by multiple redundant servers located in multiple geographic locations.

The media server 180 operates to transmit stream media 218 to media-playback devices such as the media-playback device 102. In some embodiments, the media server 180 includes a media server application 184, a processing device 186, a memory device 188, and a network access device 190. The processing device 186, memory device 188, and network access device 190 may be similar to the processing device 154, memory device 156, and network access device 160 respectively, which have each been previously described.

In some embodiments, the media server application 184 operates to stream music or other audio, video, or other forms of media content. The media server application 184 includes a media stream service 194, a media data store 196, and a media application interface 198. The media stream service 194 operates to buffer media content such as media content items 206, 208, and 210, for streaming to one or more streams 200, 202, and 204.

The media application interface 198 can receive requests or other communication from media-playback devices or other systems, to retrieve media content items from the media server 180. For example, in FIG. 2, the media application interface 198 receives communication 220 from the media-playback engine 166.

In some embodiments, the media data store 196 stores media content items 212, media content metadata 214, and playlists 216. The media data store 196 may comprise one or more databases and file systems. Other embodiments are possible as well. As noted above, the media content items 212 may be audio, video, or any other type of media content, which may be stored in any format for storing media content. The media content metadata 214 operates to provide various pieces of information associated with the media content items 212. In some embodiments, the media content metadata 214 includes one or more of title, artist name, album name, length, genre, mood, era, etc.

In some embodiments, the media data store 196 can store a plurality of playlists that have been created by one or more users over a period of time. The media data store 196 can be updated with any additional playlists that are created by a particular user (i.e., a user in question), other users, and media content service providers. In this document, the media data store 196 storing playlists can also be referred to as a playlist database 196. The playlist database can include one or more databases configured to store playlists as described herein.

The playlists 216 operate to identify one or more of the media content items 212. In some embodiments, the playlists 216 identify a group of the media content items 212 in a particular order. In other embodiments, the playlists 216 merely identify a group of the media content items 212 without specifying a particular order. Some, but not necessarily all, of the media content items 212 included in a particular one of the playlists 216 are associated with a common characteristic such as a common genre, mood, or era. As illustrated in FIG. 1, the playlists 216 can be presented as a media playlist interface 118 on the media-playback device 102. An example structure of the playlists 216 is illustrated and described in more detail with respect to FIG. 3.

Each of the media-playback device 102 and the media-delivery system 104 can include additional physical computer or hardware resources. In at least some embodiments, the media-playback device 102 communicates with the media-delivery system 104 via the network 106.

Although in FIG. 2 only a single media-playback device 102 and media-delivery system 104 are shown, in accordance with some embodiments, the media-delivery system 104 can support the simultaneous use of multiple media-playback devices, and the media-playback device can simultaneously access media content from multiple media-delivery systems. Additionally, although FIG. 2 illustrates a streaming media based system for the playlist-based media content item recommendation system 110, other embodiments are possible as well. For example, in some embodiments, the media-playback device 102 includes a media data store 196 and the media-playback device 102 is configured to perform media content item recommendation without accessing the media-delivery system 104. Further in some embodiments, the media-playback device 102 operates to store previously streamed media content items in a local media data store.

In at least some embodiments, the media-delivery system 104 can be used to stream, progressively download, or otherwise communicate music, other audio, video, or other forms of media content items to the media-playback device 102. In accordance with an embodiment, a user U can direct the input 172 to the user interface 164 to issue requests, for example, to playback media content items on the media-playback device 102.

Figure 3:
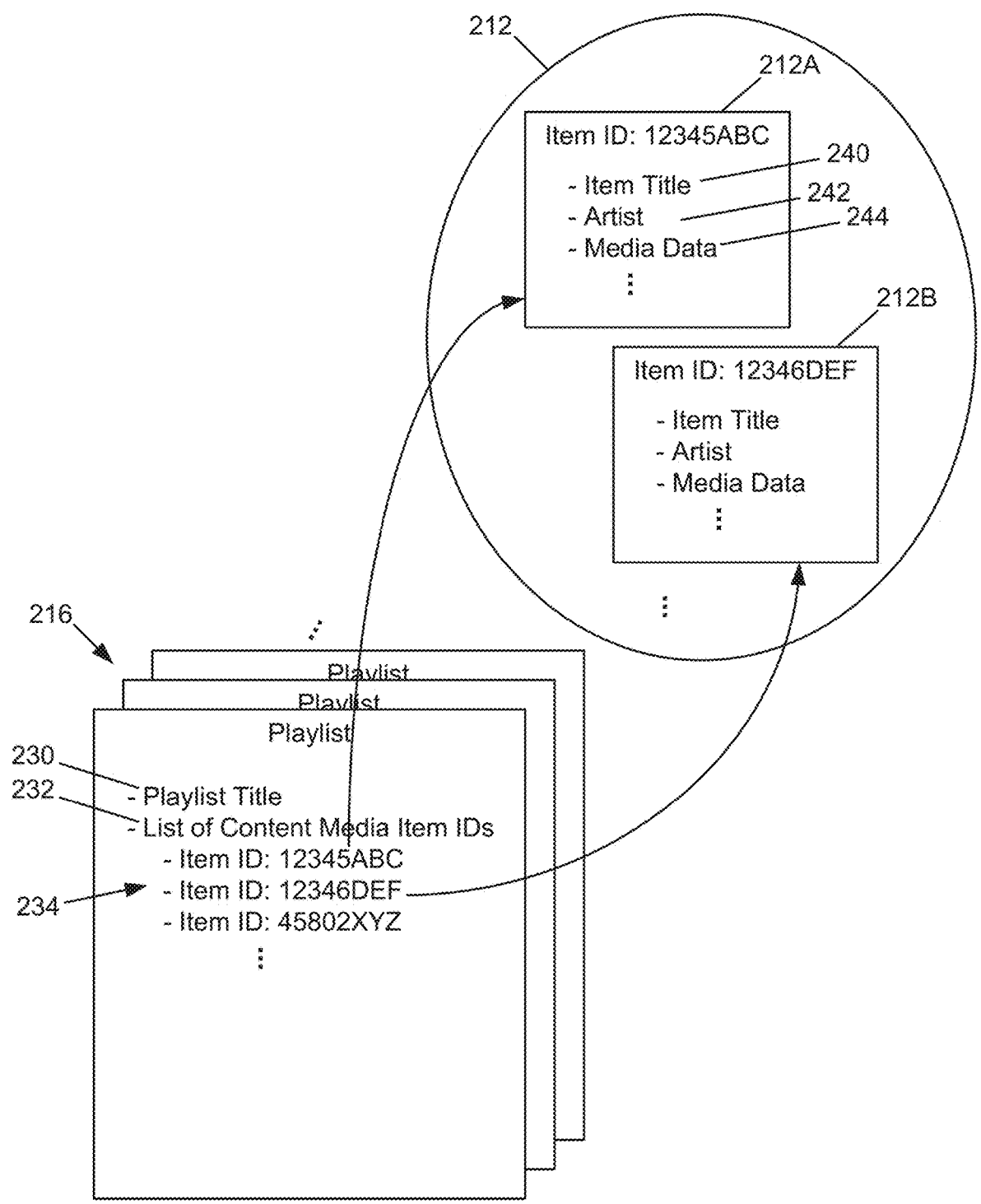
FIG. 3 is an example structure of the media content playlist.

FIG. 3 is an example structure of the playlist 216. One example playlist 216 includes a playlist title 230 and a list of content media item identifications 232. The playlist title 230 is a title of the playlist 216, which can be provided by a user using the media-playback device 102. The list of content media item identifications 232 includes one or more media content item identifications (IDs) 234 that refer to respective media content items 212.

Each media content item 212 (such as 212A and 212B) is identified by a media content item ID 234 and includes various pieces of information, such as a media content item title 240, artist identification (e.g., individual artist name or group name, or multiple artist names or group names) 242, and media content item data 244. In some embodiments, the media content item title 240 and the artist ID 242 are part of the media content metadata 214, which can further include other attributes of the media content item, such as album name, length, genre, mood, era, etc. as described herein.

Figure 4:
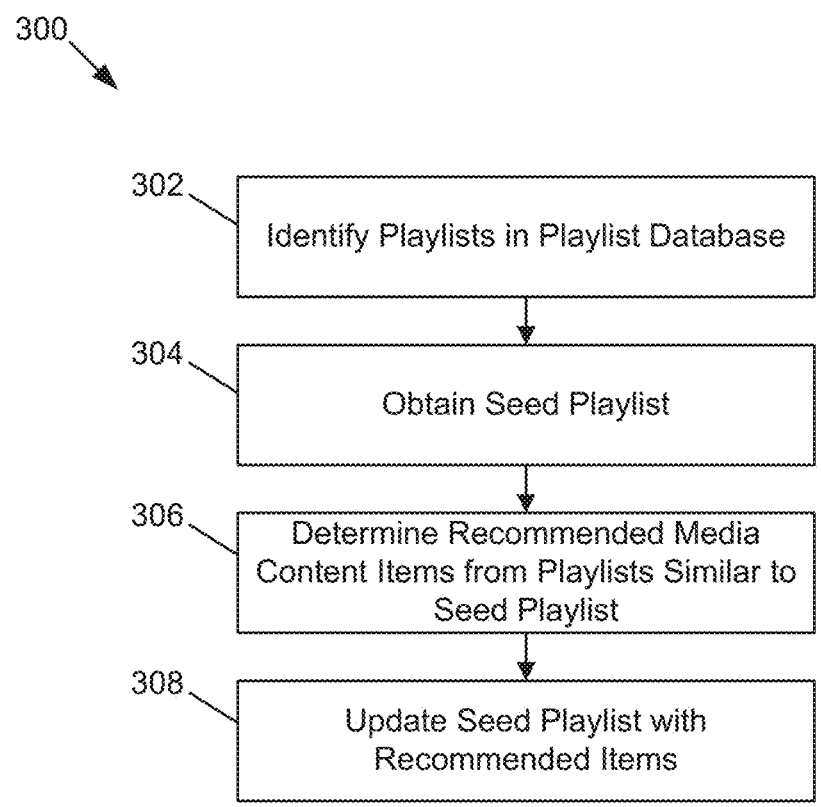
FIG. 4 is a flowchart illustrating an example method of operating the media content item recommendation system.

FIG. 4 is a flowchart illustrating an example method 300 of operating the media content item recommendation system 110. In some embodiments, the method 300 includes operations 302, 304, 306, and 308.

At operation 302, the recommendation system 110 identifies at least some of the playlists 216 stored in the playlist database 196. The playlists 216 stored in the playlist database 196 include playlists which have been created by one or more users over a period of time. The playlist database can be continuously or periodically updated with other playlists which are created by such users. In other embodiments, the playlists 216 can include playlists pre-generated by media content item service providers, such as media streaming service providers.

At operation 304, the recommendation system 110 obtains a seed playlist 130 (FIG. 1). As described herein, the seed playlist 130 is created by a user U using the media-playback device 102 or other computing devices. The seed playlist 130 may include a user-defined description of the seed playlist 130, which can be used as a basis to provide recommendation of media content items. An example method of obtaining a seed playlist is described in more detail with reference to FIG. 9. Example structures of the seed playlist 130 are described in more detail with reference to FIGS. 10 and 11.

At operation 306, the recommendation system 110 operates to select at least some of the playlists 216 that are similar to the seed playlist 130, and determine recommended media content items from the selected playlists. Various methods can be used to determine similarity between the seed playlist 130 and the stored playlists 216, which will be described herein.

At operation 308, the recommendation system 110 can update the seed playlist 130 with at least one of the recommended media content items. In some embodiments, the recommendation system 110 provides a user interface, such as the user interface 112 of the media-playback device 102, that enables a user to manually add at least one of the recommended media content items to the seed playlist 130. In other embodiments, the recommendation system 110 can automatically update the seed playlist 130 with at least one of the recommended media content items.

Figure 5:
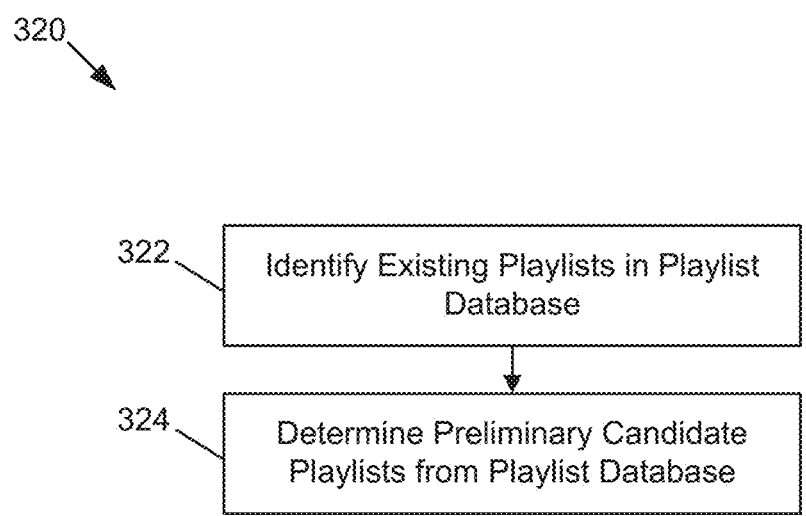
FIG. 5 is a flowchart illustrating an example method for identifying playlists in the playlist database.
Figure 6:
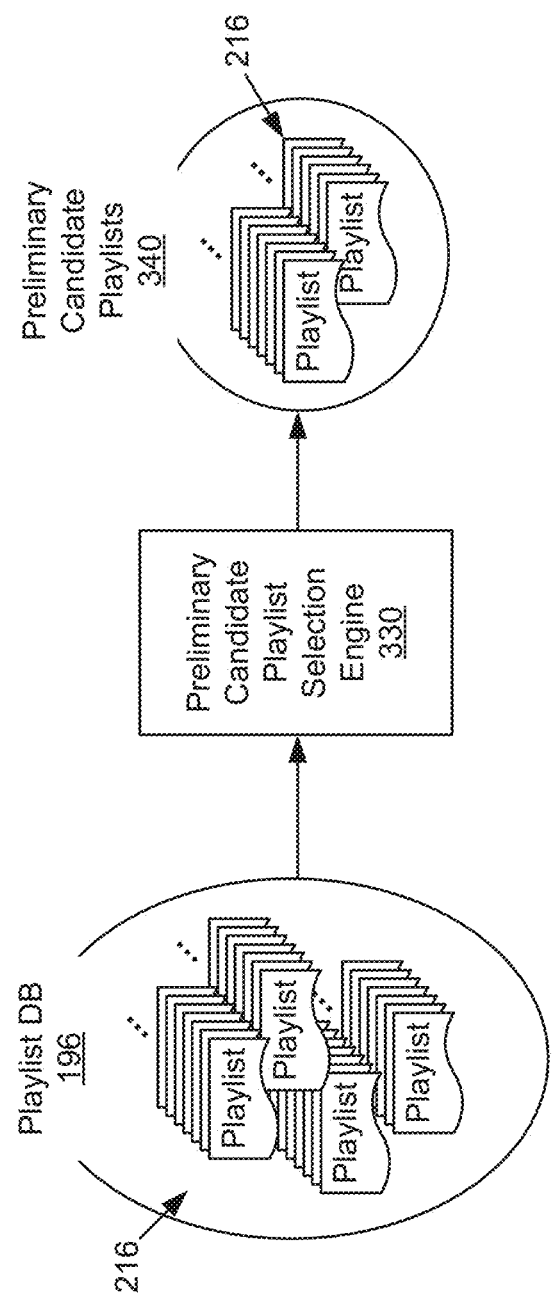
FIG. 6 illustrates the method for identifying playlists in the playlist database as shown in FIG. 5

FIG. 5 is a flowchart illustrating an example method 320 for identifying playlists in the playlist database. The method 320 is described with further reference to FIG. 6, which illustrates the method 320 of FIG. 5. In some embodiments, the method 320 includes operations 322 and 324, which can be performed by a preliminary candidate playlist selection engine 330, as shown in FIG. 6.

In general, the method 320 can be performed to identify a subset of playlists from the entire playlist database 196. Such a subset of playlists can be referred to herein as preliminary candidate playlists 340, as described below. The method 320 is designed to filter out some of the playlists that have less coherent or suitable to be used for media content item recommendations. By way of example, a user can create a playlist to simply maintain all of the user's media content items collection therein, without a particular theme or purpose that can characterize the playlist. For example, some music playlists are used to simply include all the songs from a particular album. These types of playlists are not useful as a basis for providing recommendations of media content items.

At operation 322, the recommendation system 110 (i.e., the preliminary candidate playlist selection engine 330) identifies playlists 216 existing in the playlist database 196. In some embodiments, the system 110 identifies all playlists stored in the playlist database 196. In other embodiments, the system 110 identifies some of the playlists stored in the playlist database 196.

At operation 324, the recommendation system 110 (i.e., the preliminary candidate playlist selection engine 330) operates to determine a set of preliminary candidate playlists 340 from the existing playlists in the playlist database 196. The preliminary candidate playlists 340 are playlists that have attributes suitable to contribute to recommendations of media content items.

Figure 7:
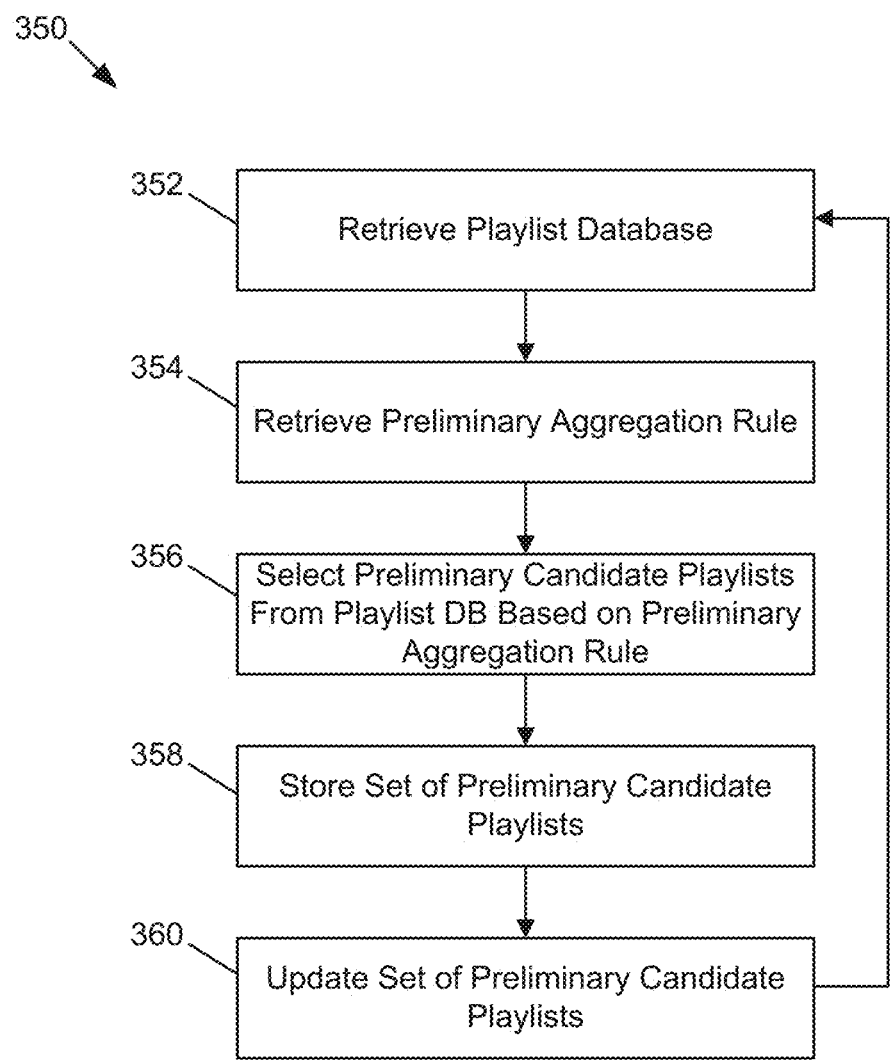
FIG. 7 is a flowchart illustrating an example method for identifying preliminary candidate playlists.

FIG. 7 is a flowchart illustrating an example method 350 for identifying preliminary candidate playlists 340. In some embodiments, the method 350 includes operations 352, 354, 356, 358, and 360.

In some embodiments, the preliminary candidate playlist selection engine 330 can perform the method 350. In other embodiments, other parts of the recommendation system 110 can be used to execute the method 350.

At operation 352, the preliminary candidate playlist selection engine 330 operates to retrieve the playlists 216 stored in the playlist database 196. In other embodiments, only some of the playlists 216 in the playlist database 196 are retrieved.

Figure 8:
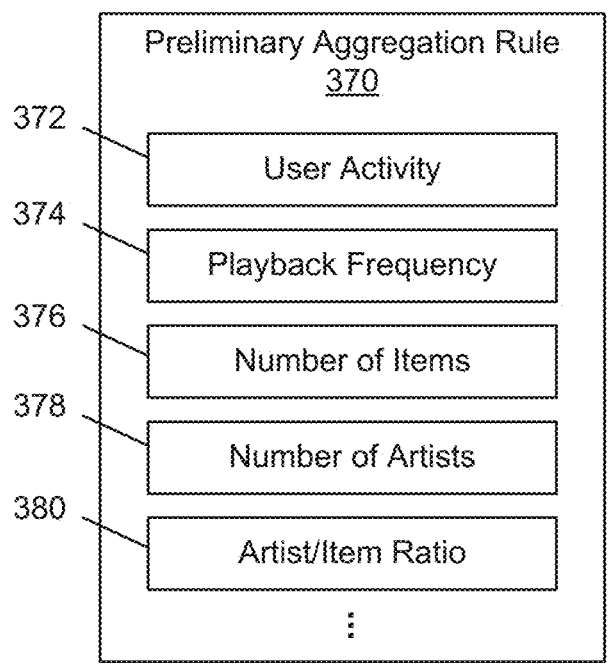
FIG. 8 is a block diagram of an example preliminary aggregation rule.

At operation 354, the preliminary candidate playlist selection engine 330 retrieves a preliminary aggregation rule 370 (FIG. 8). The preliminary aggregation rule 370 is predefined and used to select playlists that are meaningful and suitable to provide a pool of playlists, which then can result in a set of recommended media content items suited to the seed playlist. An example of the preliminary aggregation rule 370 is described in more detail with reference to FIG. 8.

At operation 356, the preliminary candidate playlist selection engine 330 operates to select playlists from the existing playlists in the playlist database 196 based on the preliminary aggregation rule 370.

At operation 358, the preliminary candidate playlist selection engine 330 stores the selected playlists as a set of preliminary candidate playlists 340. As described herein, the preliminary candidate playlists 340 provide a pool of meaningful, suitable playlists that can lead to improved recommendations of media content items for a playlist.

At operation 360, the preliminary candidate playlist selection engine 330 operates to update the set of preliminary candidate playlists 340 as the playlist database 196 changes. For example, the playlists 216 can change in the playlist database 196 as users create new playlists, remove existing playlists, and add, remove, and modify media content items in existing playlists. In some embodiments, the set of preliminary candidate playlists 340 can be updated periodically, in real-time, and/or at preset times. In some embodiments, the update of the preliminary candidate playlists 340 is performed by repeating all or some of the operations 352, 354, 356, and 358.

FIG. 8 is a block diagram of an example of the preliminary aggregation rule 370. As described above, the preliminary aggregation rule 370 is used to determine a set of preliminary candidate playlists 340 from the existing playlists in the playlist database 196. The preliminary aggregation rule 370 can be determined by one or more factors, such as a user activity 372, a playback frequency 374, a number of media content items 376, a number of artists 378, an artist/item ratio 380, and any combination thereof.

The user activity 372 relates to the number of active users over a predetermined period of time. For example, the user activity 372 indicates how many users, such as consumers of media content items, have accessed a particular playlist in a particular period of time (e.g., in a year, month, week, or day). In some embodiments, a particular playlist can be selected as a preliminary candidate playlist when the user activity 372 meets a threshold. For example, a playlist can be regarded as a preliminary candidate playlist if the number of users who accessed the playlist is greater than a threshold value.

The playback frequency 374 relates to the number of active playbacks or streams over a predetermined period of time. For example, the playback frequency 374 indicates how many media content items have been played back from a particular playlist in a particular period of time (e.g., in a year, month, week, or day). In some embodiments, a particular playlist can be selected as a preliminary candidate playlist when the playback frequency 374 meets a threshold. For example, a playlist can be regarded as a preliminary candidate playlist if the number of media content items from the playlist that have been streamed in a month is greater than a threshold value.

The number of media content items 376 indicates the number of media content items identified or included in a particular playlist. In some embodiments, a particular playlist can be selected as a preliminary candidate playlist when the number of items in the playlist meets a threshold. By way of example, a playlist can be a preliminary candidate playlist if the number of media content items contained in the playlist is greater than five (5) and smaller than 150.

The number of artists 378 indicates the number of artists identified in a particular playlist. In some embodiments, a particular playlist can be selected as a preliminary candidate playlist when the number of artists in the playlist meets a threshold. By way of example, a playlist can be a preliminary candidate playlist if the number of artists identified in the playlist is greater than five (5) and smaller than 15.

The artist/item ratio 380 indicates a ratio of the number of artists to the number of media content items in a particular playlist. In some embodiments, a particular playlist can be selected as a preliminary candidate playlist when the artist/item ratio in the playlist meets a threshold. By way of example, a playlist can be a preliminary candidate playlist if the artist/item ratio is greater than 0.2.

Figure 9:
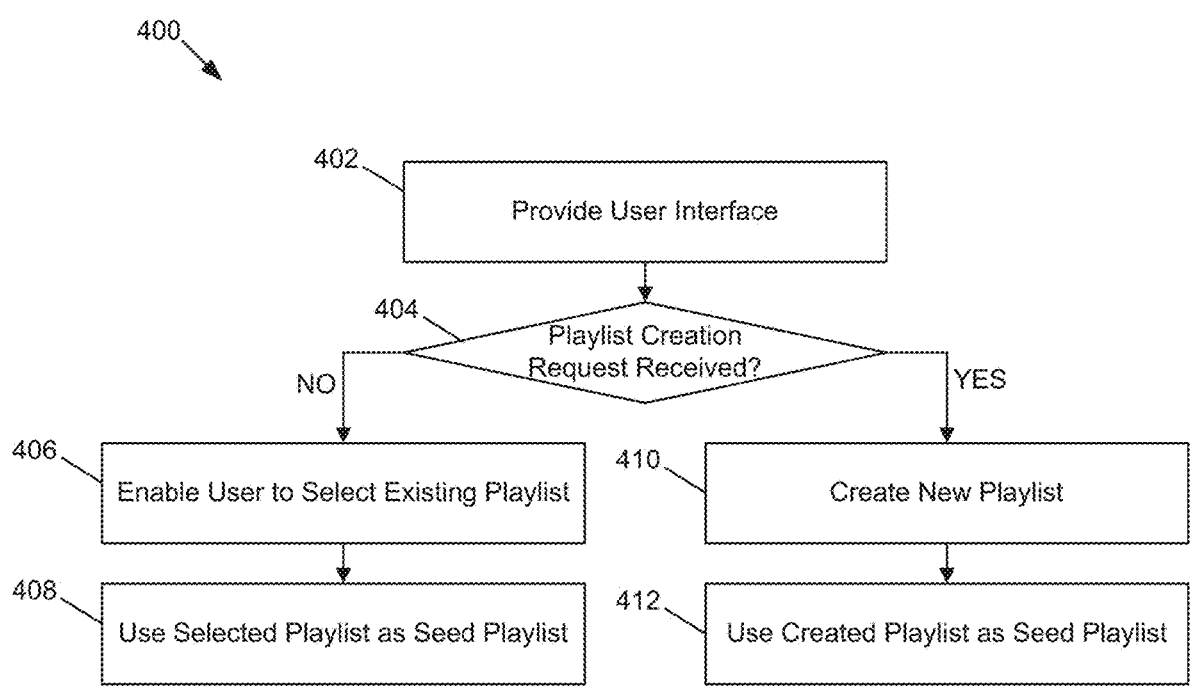
FIG. 9 is a flowchart illustrating an example method of obtaining a seed playlist.

FIG. 9 is a flowchart illustrating an example method 400 of obtaining a seed playlist 130, as shown in FIG. 4. In some embodiments, the method 400 includes operations 402, 404, 406, 408, 410, and 412.

In some embodiments, the recommendation system 110 can perform the method 400. In other embodiments, other parts of the system 100 can be used to execute the method 400.

At operation 402, the recommendation system 110 generates a user interface, such as the user interface 112, for receiving a user input or request associated with a playlist.

At operation 404, the recommendation system 110 determines whether a request is received from a user for creating a new playlist. If so ("YES" at this operation), the method 400 continues at operation 410. If not ("NO" at this operation), the method 400 moves on to operation 406.

At operation 406, the recommendation system 110 enables the user to select one of the existing playlists that have been created by the user or other users. The user interface can provide a widget with which the user can interact to select a playlist.

At operation 408, once a playlist is selected, the selected playlist is identified and used as a seed playlist 130 for media content item recommendation. As described herein, one or more attributes of the selected playlist, such as a playlist title and tracks included in the playlist, are used to recommend media content items.

At operation 410, when the request for creating a new playlist is received, the recommendation system 110 operates to create a new playlist. When creating a new playlist, the user can be required to provide at least a playlist title 230. As described herein, the playlist title 230 can be used as a basis for generating a list of recommended media content items. In addition to the playlist title 230, the user can add one or more media content items that the user wants to add in the playlist. The attributes of the existing media content items (i.e., tracks) can also be used as a basis for recommending media content items.

At operation 412, once a new playlist is created, the new playlist is identified and used as a seed playlist 130.

Figure 10:
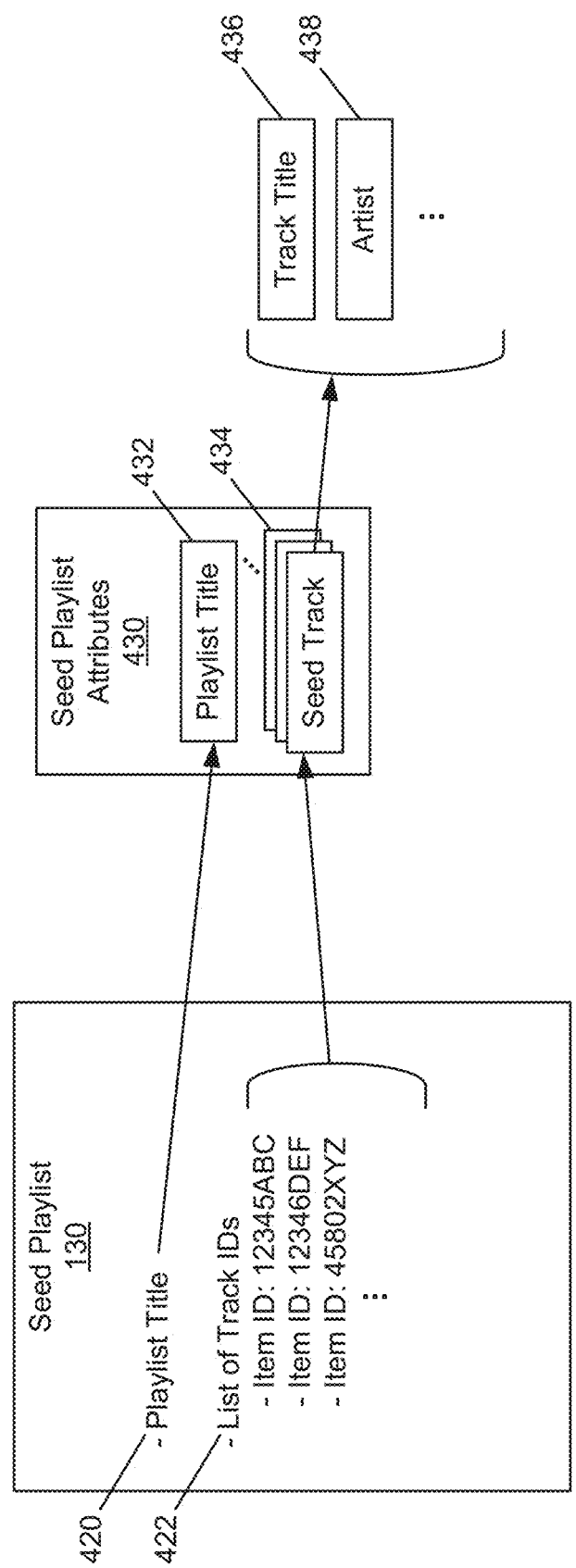
FIG. 10 illustrates an example of the seed playlist.
Figure 11:
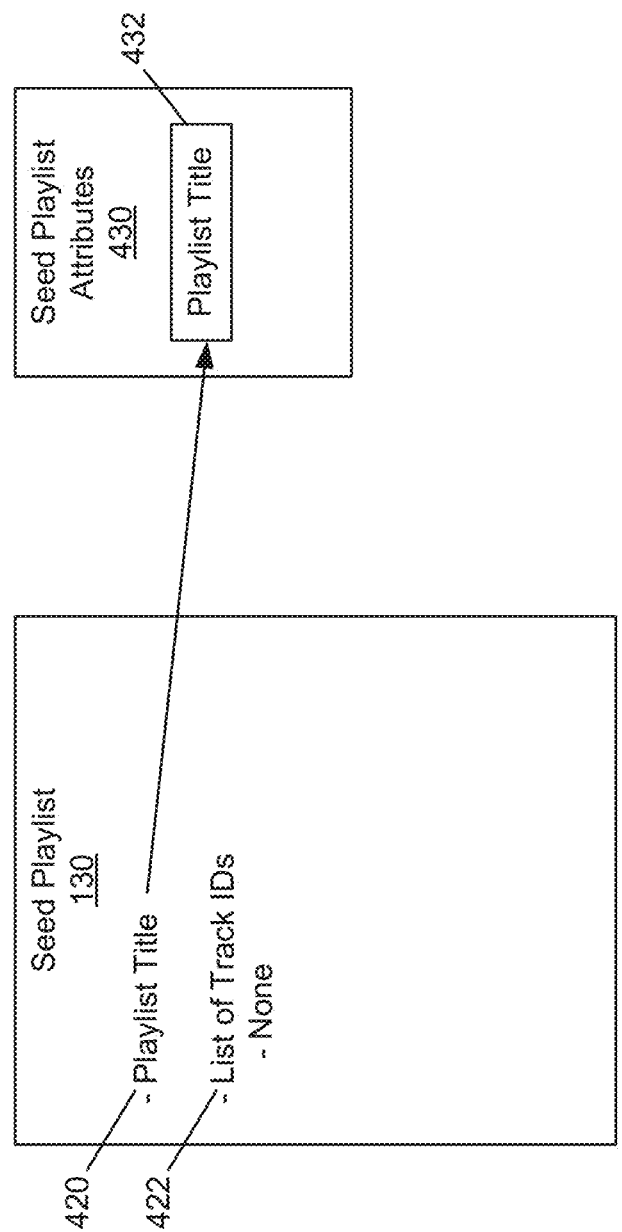
FIG. 11 illustrates another example of the seed playlist.

Referring to FIGS. 10 and 11, examples of the seed playlist 130 are described. In particular, FIG. 10 illustrates a first example of the seed playlist 130. In this example, the seed playlist 130 has both of a playlist title 420 and a list of media content items (i.e., tracks) 422.

The playlist title 420 can be created by a user who creates the playlist 130. In some embodiments, the user can create the playlist title 420 to describe the nature, attribute, or characteristic of the playlist 130 so that the playlist title 420 can represent what kind of media content items are included, or intend to be included, in the playlist 130. In other embodiments, a generic description can be used by a user as the playlist title 420 so that the playlist title 420 does not represent or imply the nature, attribute or characteristic of the playlist 130 or media content items included in the playlist 130.

The list of media content item IDs (i.e., track IDs) 422 includes identification information that refers to a list of media content items that are included in the seed playlist 130. Alternatively, the seed playlist 130 is designed to actually include a list of media content item files or data.

One or more attributes 430 can be obtained from the seed playlist 130. In this example, the seed playlist attributes 430 includes a playlist title attribute 432 and a list of seed track attributes 434.

The playlist title attribute 432 can be obtained from the playlist title 420 of the seed playlist 130. In some embodiments, the playlist title attribute 432 is determined based on the text of the playlist title, including at least one of the words, numbers, characters, and/or phrases consisting of the playlist title 420.

The seed track attribute 434 includes information about a seed media content item or seed track. In some embodiments, all of the media content items 422 included in the seed playlist 130 are used as the seed tracks and thus evaluated to generate a list of seed track attributes 434. In other embodiments, only one or some of the media content items 422 included in the seed playlist 130 are used as a single seed track or a plurality of seed tracks, and thus are reviewed to generate the seed track attributes 434.

The seed track attribute 434 associated with a seed track include various pieces of information about the seed track. In some embodiments, the seed track attribute 434 includes a track title 436 and an artist name 438. The track title 436 is a title for a seed track. The artist name 438 is a name of the artist of the seed track.

FIG. 11 illustrates a second example of the seed playlist 130. In this example, the seed playlist 130 has a playlist title 420 only and does not have any media content item 422 therein. Other than having no media content items in the seed playlist, the seed playlist 130 in this example is configured similarly to the seed playlist 130 in FIG. 10. Therefore, the description of the seed playlist 130 in this example is omitted for brevity. As no media content item is identified by the seed playlist 130, the seed playlist attribute 430 only includes the playlist title attribute 432.

Figure 12:
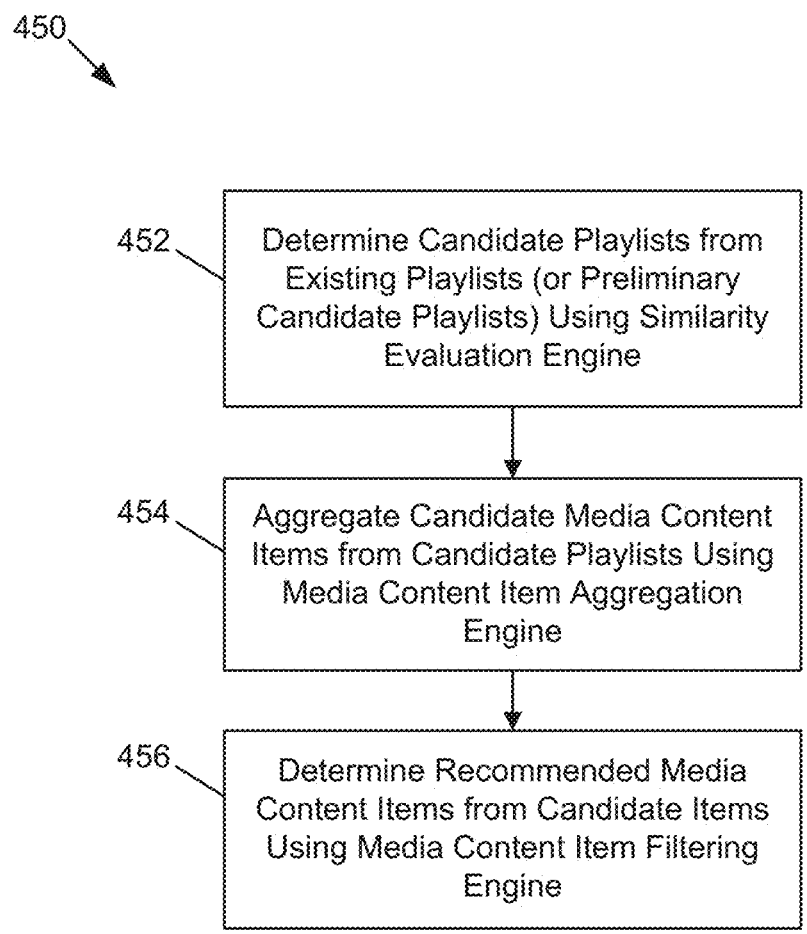
FIG. 12 is a flowchart illustrating an example method for determining recommended media content items based on the seed playlist attributes.

FIG. 12 is a flowchart illustrating an example method 450 for determining recommended media content items based on the seed playlist attributes 430. In some embodiments, the method 450 includes operations 452, 454, and 456. The method 450 is described with further reference to FIG. 13.

In some embodiments, the method 450 implements the operation 306 in which at least some of the playlists 216 similar to the seed playlist 130 are selected and recommended media content items are determined from the selected playlists, as shown in FIG. 3.

Figure 13:
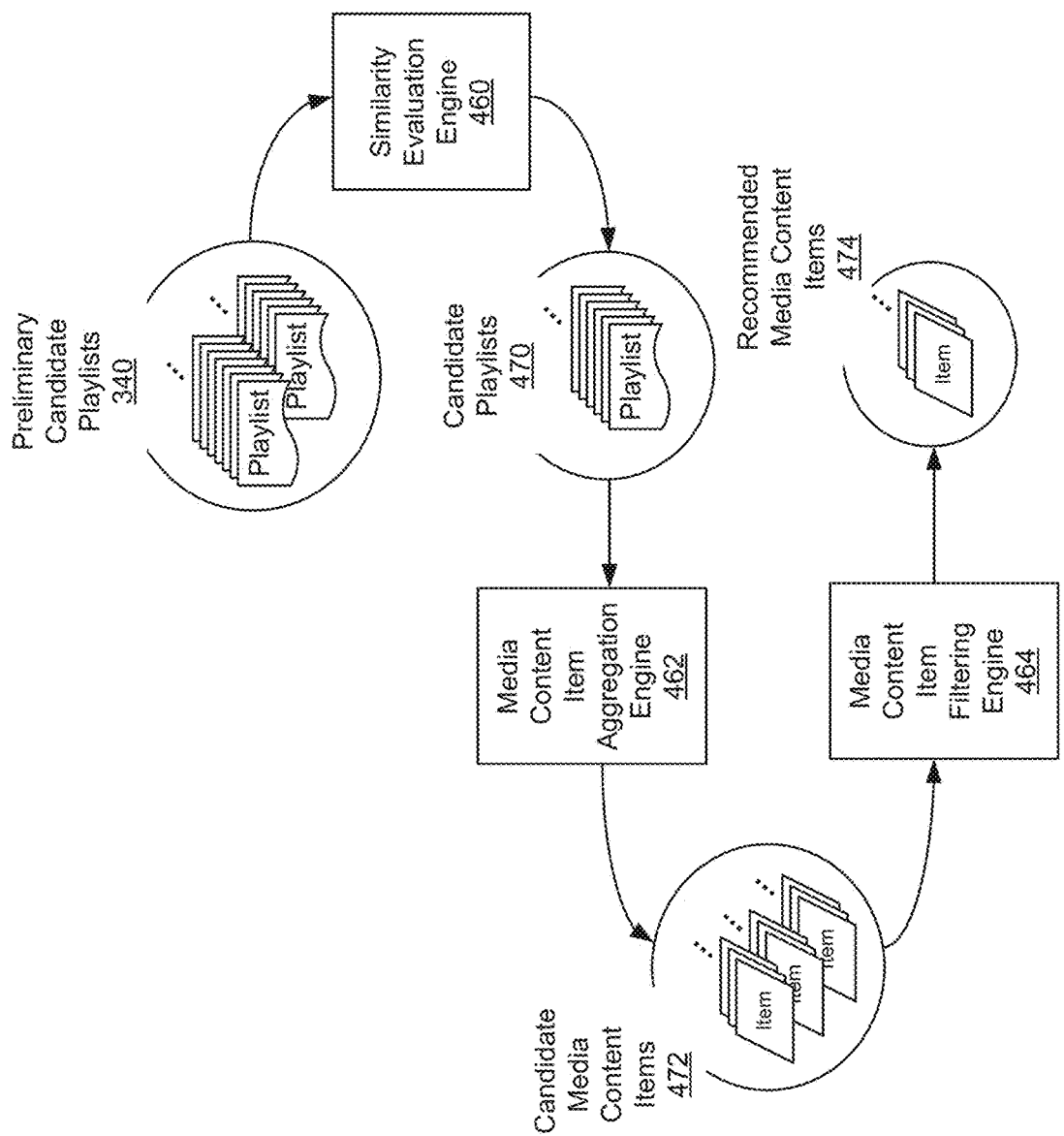
FIG. 13 illustrates the method for determining recommended media content items as shown in FIG. 12.

The method 450 can be performed by the recommendation system 110 and/or other parts of the system 100. As shown in FIG. 13, the recommendation system 110 can include a similarity evaluation engine 460, a media content item aggregation engine 462, and a media content item filtering engine 464. In other embodiments, the recommendation system 110 includes only one or two of the similarity evaluation engine 460, the media content item aggregation engine 462, and the media content item filtering engine 464 to generate recommended media content items. For example, the recommendation system 110 includes the similarity evaluation engine 460 only, or includes the similarity evaluation engine 460 and one of the media content item aggregation engine 462, and the media content item filtering engine 464. In yet other embodiments, the recommendation system 110 includes other engines for suitable processing.

At operation 452, the recommendation system 110 determines a set of candidate playlists 470 from the preliminary candidate playlists 340 using the similarity evaluation engine 460. Alternatively, where the method 320 in FIG. 5 or the method 350 in FIG. 7 is not used (i.e., all the playlists existing in the playlist database are used for the operation 452), the recommendation system 110 determines a set of candidate playlists 470 from the existing playlists in the playlist database 196.

The similarity evaluation engine 460 operates to determine the candidate playlists 470 from the preliminary candidate playlists 340, or directly from the playlists existing in the playlist database 196 (where no preliminary candidate playlists 340 are determined beforehand). As described herein, the similarity evaluation engine 460 compares each of the preliminary candidate playlists with the seed playlist and provides a similarity score based on the comparison. The similarity score is used to determine whether a particular preliminary candidate playlist is to be a candidate playlist. A set of candidate playlists 470 includes one or more playlists with media content items which provide a pool of media content items that are selectively used for recommendations.

At operation 454, the recommendation system 110 aggregates a set of candidate media content items 472 from the candidate playlists 470 using the media content item aggregation engine 462.

The media content item aggregation engine 462 operates to aggregate the media content items from the candidate playlists 470 based on a selected aggregation model. A set of candidate media content items 472 provide media content items that are well suited for the attributes of the seed playlist and can be selectively used for recommendations.

At operation 456, the recommendation system 110 determines a set of recommended media content items 474 from the candidate media content items 472 using the media content item filtering engine 464.

The media content item filtering engine 464 operates to filter the candidate media content items 472 to finally find a set of recommended media content items 474. A set of recommended media content items 474 are media content items that are to be presented to the user as recommendations.

Figure 14:
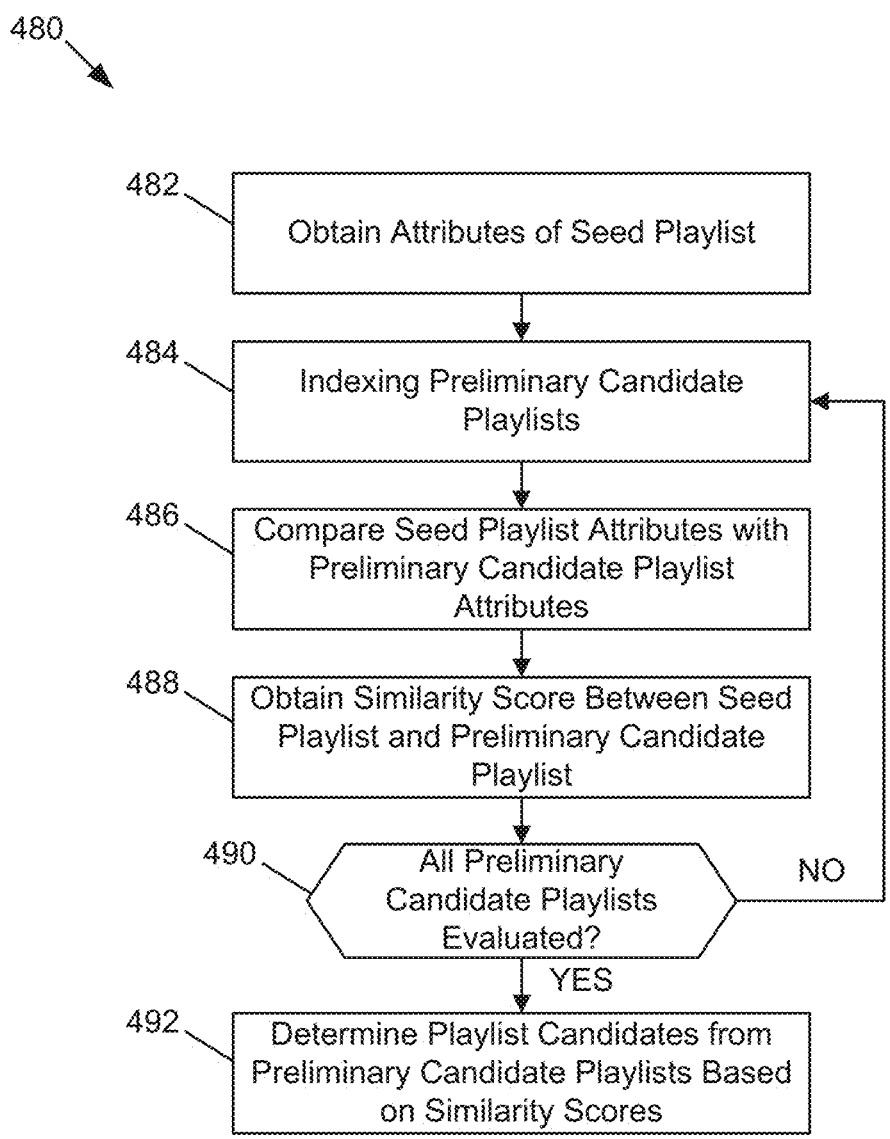
FIG. 14 is a flowchart illustrating an example method of determining a set of candidate playlists.

FIG. 14 is a flowchart illustrating an example method 480 of determining a set of candidate playlists 470. In some embodiments, the similarity evaluation engine 460 can be used to perform the method 480. In some embodiments, the method 480 includes operations 482, 484, 486, 488, 490, and 492.

At operation 482, the similarity evaluation engine 460 operates to obtain the seed playlist attributes 430 of the seed playlist 130. As described above, the seed playlist attributes 430 can includes attributes of the playlist title 432 and/or the seed tracks 434.

At operation 484, the similarity evaluation engine 460 operates to index the preliminary candidate playlists 340. Alternatively, where the method 320 in FIG. 5 or the method 350 in FIG. 7 is not used (i.e., all the playlists existing in the playlist database are used for the operation 452), the similarity evaluation engine 460 can index all the existing playlists in the playlist database 196. Although the method 480 is primarily described with the preliminary candidate playlists 340, the method 480 can also be used similarly with the existing playlists in the playlist database.

With indexing the preliminary candidate playlists 340, the similarity evaluation engine 460 can obtain the attributes of each preliminary candidate playlist 340. For example, at least one of the playlist title, the track IDs, and the artist IDs of the preliminary candidate playlists 340 are indexed.

At operation 486, the similarity evaluation engine 460 compares the seed playlist attributes 430 with the attributes of each preliminary candidate playlist 340. As described in FIG. in some embodiments, the playlist title, the track attributes, and/or the artist attributes are used to compare the attributes of the seed playlist and the preliminary candidate playlists.

At operation 488, the similarity evaluation engine 460 obtains a similarity score between the seed playlist attributes 430 with the attributes of each preliminary candidate playlist 340.

The similarity score represents how similar or close a particular preliminary candidate playlist 340 is to the seed playlist 130. The similarity score can be represented in various formats. In one possible embodiment, the similarity score is represented with a number between a predetermined range, such as 1 to 10 or 1 to 100. In another embodiment, the similarity score is represented with a number of levels or degrees, such as low/medium/high or low/high. The similarity score is further described with reference to FIG. 15.

At operation 490, the similarity evaluation engine 460 determines whether all the preliminary candidate playlists 340 have been evaluated in operations 484, 486, and 488. If it is determined that all the preliminary candidate playlists 340 have been evaluated ("YES" at this operation), the method 480 moves on to operation 492. Otherwise ("NO" at this operation), the method 480 returns to operation 484 and the subsequent operations to evaluate the remaining playlists.

At operation 492, the similarity evaluation engine 460 operates to determine a set of candidate playlists 470 from the preliminary candidate playlists 340 based on the similarity scores. In some embodiments, the set of candidate playlist 470 can be ones of the preliminary candidate playlists 340 that have similarity scores that satisfies a predetermined similarity threshold. For example, if a playlist from the preliminary candidate playlists 340 has a similarity score that is above a predetermined threshold value, such a playlist is considered to be a candidate playlist 470.

Figure 15:
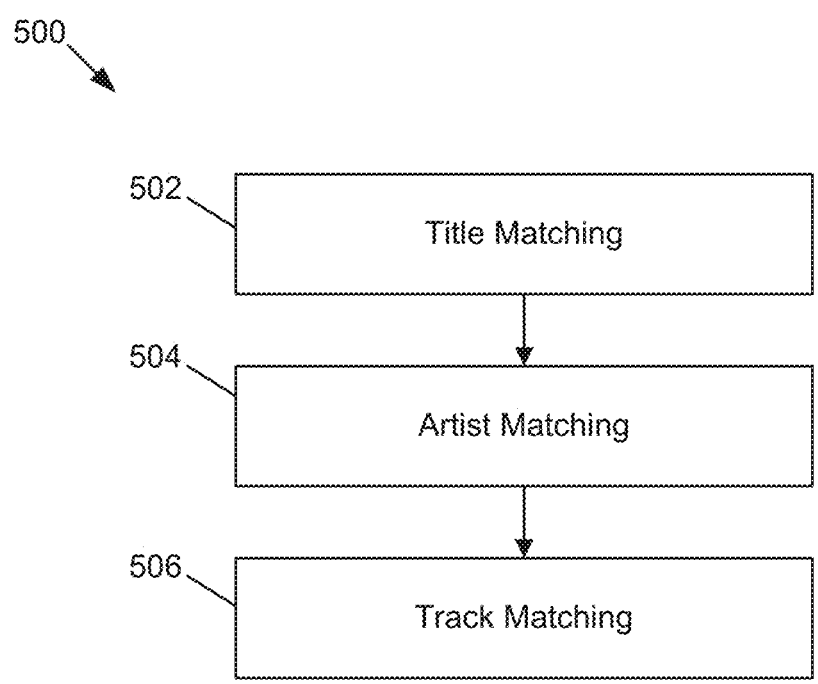
FIG. 15 is an example method of obtaining a similarity score between a seed playlist and a playlist from the playlist database.

FIG. 15 is an example method 500 of obtaining a similarity score between a seed playlist 130 and a playlist from the playlist database 196. In some embodiments, the similarity score can be obtained by at least one of operations 502, 504, and 506. By way of example, the similarity score is obtained by operation 502 only. In other example, the similarity score can be obtained by either operation 504 or 506, or any combination of operations 502, 504, and 506. As described in FIG. 14, the playlist from the playlist database 196 can be one of the existing playlists in the playlist database 196 or one of the preliminary candidate playlists 340. In this document, such a playlist from the playlist database 196 can also be referred to as a reference playlist, as opposed to the seed playlist 130.

In some embodiments, the similarity score between a seed playlist 130 and a reference playlist can be obtained based on title matching at operation 502. The title matching measures how much the playlist title 432 of the seed playlist 130 is overlapped with the playlist title of the reference playlist. In some embodiments, the title matching determines whether the playlist titles are exactly identical to determine they are matched. In other embodiments, the playlist titles can be tokenized, and the tokens (e.g., words, phrases, symbols, or other elements) can be compared for performing the title matching.

In addition or alternatively, artist matching can be used to determine the similarity score between the seed playlist 130 and the reference playlist, at operation 504. The artist matching measures how many artists 438 in the seed playlist 130 matches the artists in the reference playlist. When comparing artists, in some embodiments, the artist matching determines the exact match between the artists in the seed playlist and the artists in the reference playlist. In other embodiments, the artist names in the seed playlist and the reference playlist are tokenized and such tokens are compared to calculate how much the artists are overlapped between the seed playlist and the reference playlist.

Where multiple artists are associated with a single track, a group name for the artists can be used to the artist matching, in some embodiments. In other embodiments, each of the multiple artists in a particular track can be compared with the artists identified in a reference playlist. In yet other embodiments, all of the multiple artists are to be matched with the artists of a particular track in a reference playlist.

In addition or alternatively, at operation 506, the similarity score between the seed playlist 130 and the reference playlist can be obtained based on track matching. The track matching measures how many tracks (i.e., media content items) 438 in the seed playlist 130 matches the tracks in the reference playlist.

In some embodiments, the track matching determines the exact match between the tracks in the seed playlist and the tracks in the reference playlist. In other embodiments, the track names in the seed playlist and the reference playlist are tokenized and such tokens are compared to calculate how much the tracks are overlapped between the seed playlist and the reference playlist.

In some embodiments, the tracks in the seed playlist and the reference playlist are canonicalized so that all tracks that are of the same recording are assigned a single canonical ID. Canonicalization is a process for converting data that has more than one possible representation into a standard, normal, or canonical form. For example, all versions of a particular song by a particular artist across all albums can be represented by a single ID, while cover songs by other artists can have different IDs. In some embodiments, such canonicalization can be performed when indexing the playlists as described herein.

In this example, it is primarily described that the attributes of the seed playlist 130 are compared with the corresponding attributes of the reference playlist. For example, the playlist title of the seed playlist is compared with the playlist title of the reference playlist, the artists in the seed playlist is compared with the artists in the reference playlist, and the tracks in the seed playlist is compared with the tracks in the reference playlist. However, in other embodiments, the attributes of the seed playlist can be compared with non-corresponding attributes of the reference playlist. For example, the playlist title of the seed playlist is compared with the artists, tracks, and/or other attributes of the reference playlist, the artists in the seed playlist is compared with the playlist title, tracks, and/or other attributes of the reference playlist, and the tracks in the seed playlist is compared with the playlist title, artists, and/or other attributes in the reference playlist.

Figure 16:
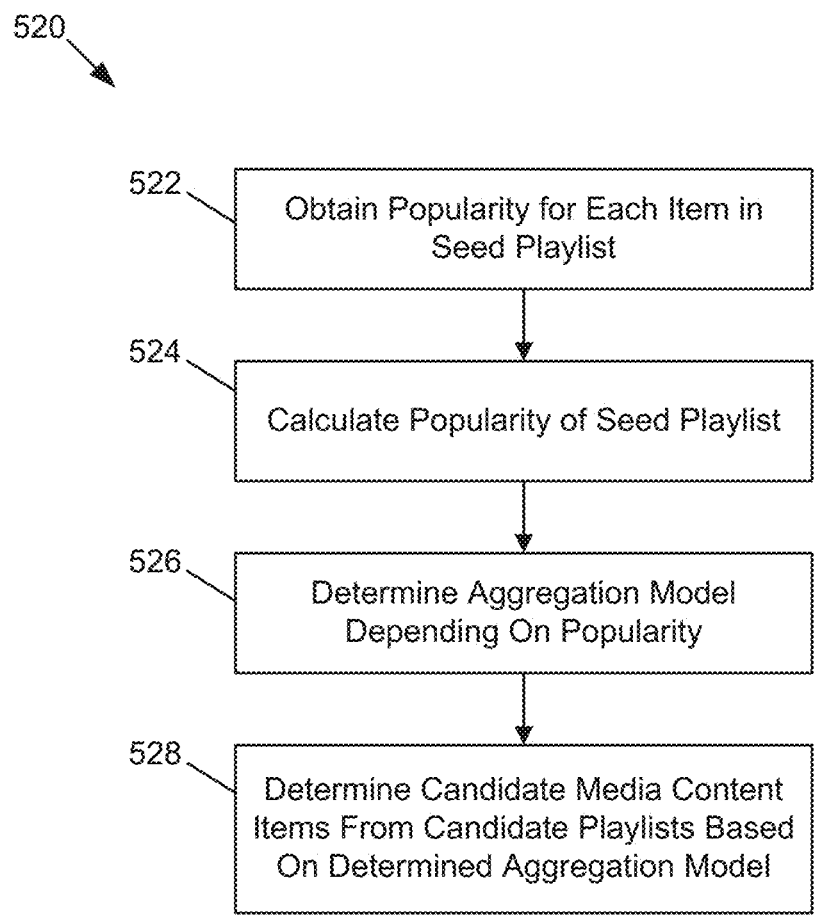
FIG. 16 is a flowchart illustrating an example method of aggregating candidate media content items.

FIG. 16 is a flowchart illustrating an example method 520 of aggregating candidate media content items 472. In some embodiments, the media content item aggregation engine 462 can be used to perform the method 520. In some embodiments, the method 520 includes operations 522, 524, 526, and 528.

In general, the media content item aggregation engine 462 operates to aggregate media content items from the candidate playlists 470, which are determined to be similar to the seed playlist 130 as described above. The outcome of aggregation of media content items can vary depending on an aggregation model that is selected.

At operation 522, the media content item aggregation engine 462 operates to obtain popularity of each media content item in the seed playlist 130. In some embodiments, each of the media content items in the seed playlist 130 can have a popularity score as one of the attributes. Such a popularity score represents how popular the particular media content item is currently. The popularity score of media content item can be determined based on various factors, such as a number of playbacks, a chart ranking, and reviews, and stored in the metadata of the media content item. Other methods of determining or calculating the popularity score can also be possible.

At operation 524, the media content item aggregation engine 462 operates to calculate a popularity of the seed playlist 130. The popularity of the seed playlist 130 can be used to infer how many popular tracks the seed playlist intends to include, or how much the user who has created the seed playlist would like to add popular tracks in the seed playlist.

In some embodiments, the seed playlist popularity can be calculated by averaging the popularity scores of all the media content items in the seed playlist 130. In other embodiments, the seed playlist popularity can be calculated by averaging the popularity scores of some of the media content items in the seed playlist 130. In some embodiments, the popularity score can be represented by a number in a particular range, such as a range between 1 and 100 where 100 indicates the most popular.

At operation 524, the media content item aggregation engine 462 determines an aggregation model that is suitable for the seed playlist 130 based on the seed playlist popularity score. The popularity of the seed playlist (e.g., either hipster or mainstream) can determine an aggregation algorithm which can aggregate media content items that better match the characteristic of the seed playlist.

In one possible embodiment, aggregation models can be categorized as a first aggregation model and a second aggregation model. The first aggregation model is designed to aggregate media content items from the candidate playlists 470 (i.e., playlists determined to be similar to the seed playlist) such that the media content items that occur most frequently across all of the candidate playlists 470 are surfaced at recommendations. As a result, the first aggregation model provides recommendations that are biased toward popular tracks. By way of example, if a user is building a playlist named "workout," the first aggregation module selects media content items that are popular among the candidate playlists similar to the "workout" seed playlist. In this regard, the first aggregation model is also referred to herein as a mainstream aggregation model.

In some applications, the mainstream aggregation model can result in popularity bias. For example, where the mainstream aggregation model can simply aggregate all the media content items from the candidate playlists 470, the mainstream aggregation model recommends media content items that are most frequently shown in the candidate playlists 470. However, in this configuration, popular media content items are more likely to surface up and can be dominantly used as recommended media content items. By way of example, certain media content items are so popular as to be included in a variety of unrelated playlists (e.g., "workout" playlists, "running" playlists, and "chore" playlists). Therefore, popular media content items are not necessarily distinct and suitable for a seed playlist with a particular attribute.

The second aggregation model is designed to aggregate media content items from the candidate playlists 470 so as to surface up distinctive media content items among the candidate playlists 470. The second aggregation model can reduce popularity bias by selecting media content items based on their distinctiveness. In some embodiments, the second aggregation model is configured to select media content items that appear frequently in the candidate playlists, but are infrequently shown across the preliminary candidate playlists or all the playlists existing in the playlist database. In this regard, the second aggregation model is also referred to herein as a hipster aggregation model.

Some examples of the aggregation model include a term frequency—inverse document frequency (TFIDF) model, the Mutual Information model, and the Normalized Google Distance model. By way of example, in the TFIDF, the term frequency is determined as the frequency of a particular media content item across the candidate playlists, and the inverse document frequency is determined as the frequency of the particular media content item across the preliminary candidate playlists or all the playlists existing in the playlist database. Then, a ratio between the term frequency and the inverse document frequency is calculated to measure a distinctiveness of the particular media content item.

The Mutual Information model measures how much information a particular media content item contains about the candidate playlists. The amount of information can be measured in the information-theoretic sense. By way of example, if a term's distribution is the same in the candidate playlists as it is across the all the playlists in the playlist database as a whole, then the mutual information for that item approaches zero. If the media item is present in a playlist if and only if the playlist matches the seed playlist then the Mutual Information for that item reaches its maximum value. Items with high mutual information can be considered to be similar.

In the Google Distance Model, by way of example, the frequency of two particular media items is compared to the co-occurrence of the two items. This comparison is normalized by dividing this value by the total number of playlists in the candidate pool that do not contain the least frequently occurring of the two media items. If the resulting distance is low the two particular items are similar, if it is high, the items are dissimilar.

Referring still to FIG. 16, at operation 528, the media content item aggregation engine 462 operates to determine candidate media content items 472 from the candidate playlists 470 based on the selected aggregation model.

Figure 17:
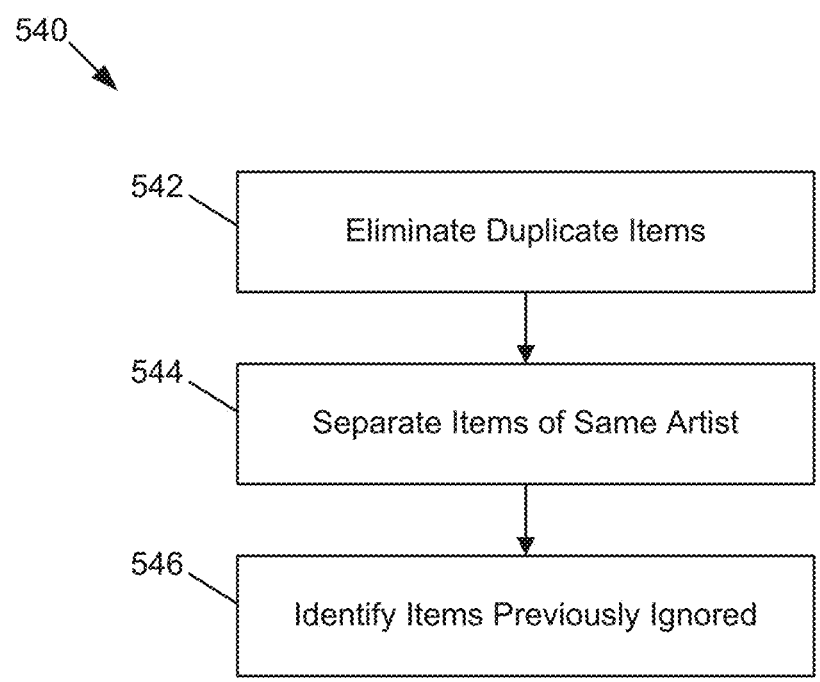
FIG. 17 is a flowchart illustrating an example method of determining recommended media content items.

FIG. 17 is a flowchart illustrating an example method 540 of determining recommended media content items 474. In some embodiments, the media content item filtering engine 464 can be used to perform the method 540. In some embodiments, the method 540 includes at least one of operations 542, 544, and 546.

In general, the media content item filtering engine 464 operates to filter the candidate media content items 472 to determine a set of recommended media content items 474 which are to be selectively presented to the user as recommendations.

At operation 542, the media content item filtering engine 464 determines a media content item from the candidate media content items 472 that already exists in the seed playlist 130. The media content item that is duplicated in the seed playlist 130 is eliminated from a list of recommended media content items 474.

At operation 544, the media content item filtering engine 464 performs to separate multiple media content items of the same artist in the list of recommended media content items 474 so that the media content items of the same artist do not concentrate at certain portion of the list. In some embodiments, two media content items of the same artist can be separated by a minimum artist separation rule. The minimum artist separation rule defines a number of items placed between the media content items of the same artist. By way of example, where the minimum artist separation rule is five (5), two media content items of the same artist are separated by five other media content items therebetween.

In other examples, using the minimum artist separation rule, the media content item filtering engine 464 can present multiple media content items of the same artist in different batches of recommended media content items. In some embodiments, the recommended media content items 474 are grouped to a plurality of batches, and are presented to the user batch by batch. By way of example, six of the recommended media content items 474 are grouped into a batch, and the batch of six items is presented to the user at a time. In this application, if the minimum artist separation rule is set to be five (5), two media content items of the same artist are not shown in the same batch.

At operation 546, the media content item filtering engine 464 operates to identify media content items that have previously ignored by the user. In some embodiments, the user of the seed playlist can select and add one or more of the recommended media content items 474 and ignore the rest of the recommended media content items 474. The media content item filtering engine 464 operates to track the media content items that have been added to the playlist and ignored by the user so that the ignored media content items are not included in a later set of recommended media content items.

In some embodiments, the media content item filtering engine 464 operates to track how many media content items of a particular artist have been presented to the user in different lists of recommended media content items and how many times the user have ignored such media content items of the particular artist. By way of example, as the user repeatedly ignores media content items of a particular artist, the media content item filtering engine 464 reduces the likelihood that media content items of the artist are included in the lists or batches of recommended media content items. As such, depending on the number of ignored media content items of a particular artist, the media content item filtering engine 464 generates a score for the particular artist, and adjust the chance of adding media content items of the artist in lists of recommended media content items 474 based on the score. In other embodiments, if the user ignores a predetermined number of media content items of a particular artist, the media content item filtering engine 464 can decide not to recommend any media content item of the artist in the future (or for a predetermined period of time or a predetermined cycle or round).

Figure 18:
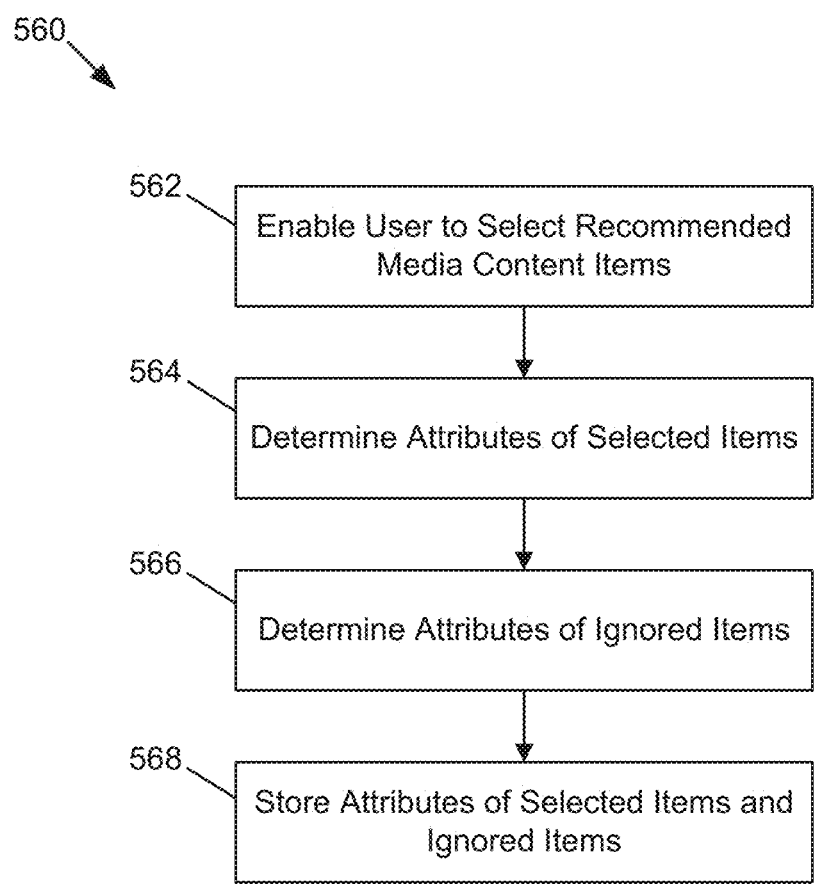
FIG. 18 is a flowchart illustrating an example method of updating the seed playlist with the recommended media content items.

FIG. 18 is a flowchart illustrating an example method 560 of updating the seed playlist 130 with the recommended media content items 474. In some embodiments, the method 560 is configured to perform the operation 308 in FIG. 4. In the illustrated example, the method 560 includes operations 562, 564, 566, and 568.

At operation 562, the recommendation system 110 operates to enable the user of the seed playlist to select one or more of the recommended media content items 474. In some embodiments, the recommendation system 110 provides the media recommendation interface 120 as shown in FIG. 1 through which the recommended media content items 474 are presented such that the user can select one or more of the recommended media content items 474 and add them to the seed playlist 130.

At operation 564, the recommendation system 110 operates to determine attributes of the media content items that are selected by the user from the recommended media content items 474.

At operation 566, the recommendation system 110 operates to determine attributes of the media content items that are ignored (i.e., not selected) by the user from the recommended media content items 474.

At operation 568, the recommendation system 110 stores the attributes of the selected media content items and the attributes of the ignored media content items for later process. In some embodiments, the attributes of the selected media content items and the attributes of the ignored media content items can be used to define the attribute or characteristic of the seed playlist 130. In other embodiments, the attributes of the selected media content items and the attributes of the ignored media content items can be used to determine sets of recommended media content items in later processes.

Figure 19:
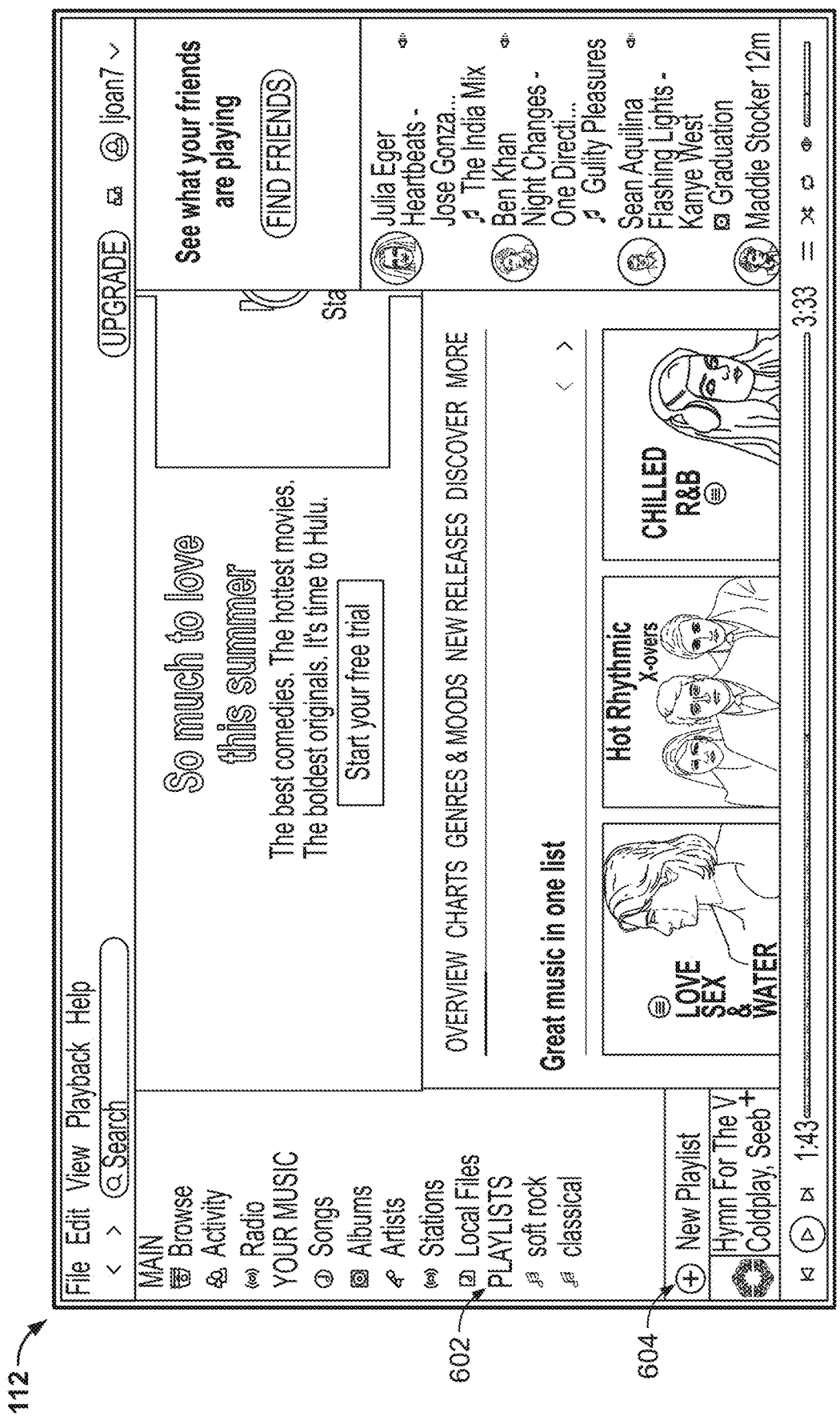
FIG. 19 illustrates an example user interface presented on a user computing device.
Figure 20:
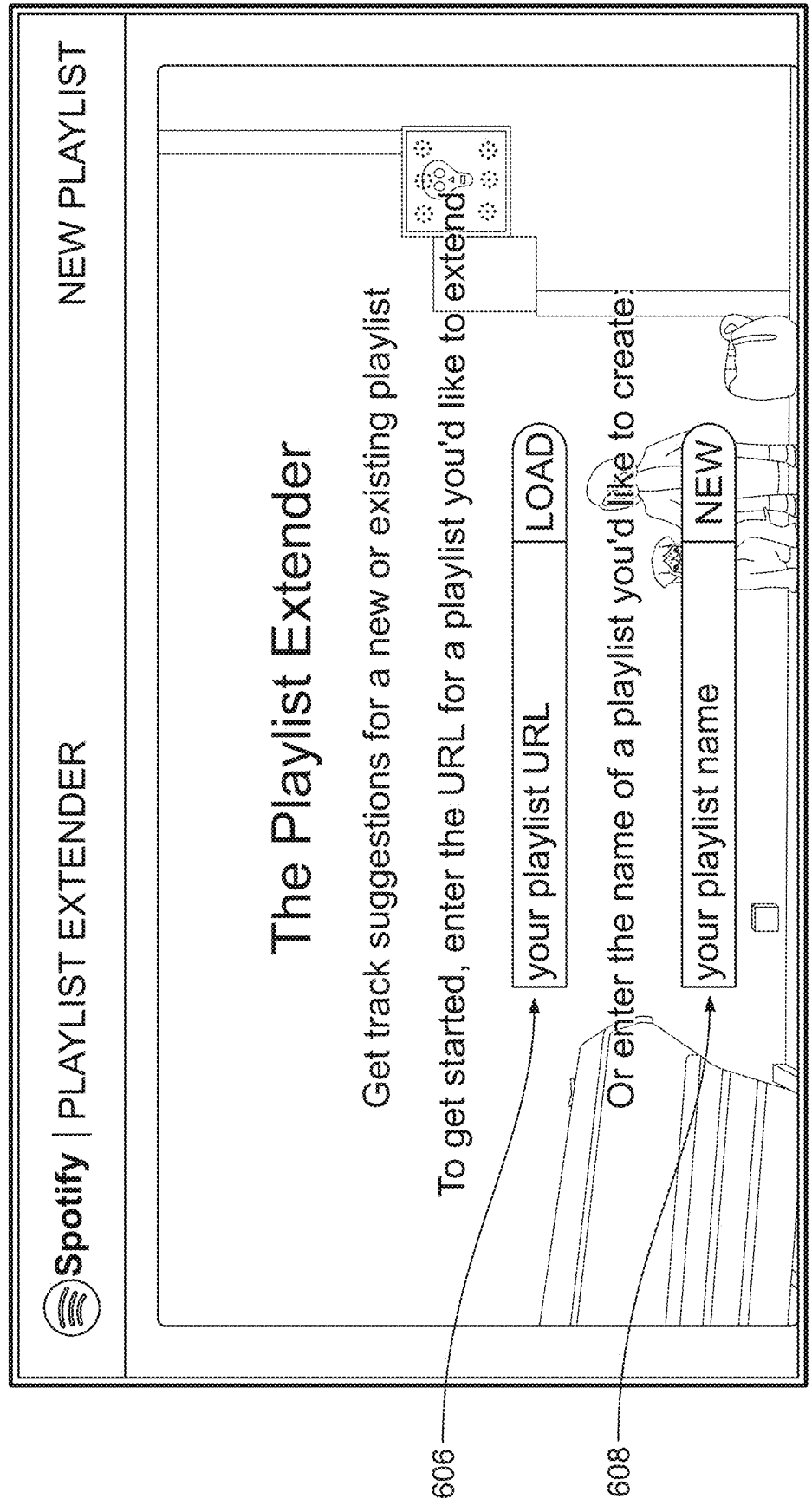
FIG. 20 illustrates another example of the user interface.

Referring to FIGS. 19 and 20, example user interfaces for receiving a user input relating to a playlist. In particular, FIG. 19 illustrates an example of the user interface 112 presented on a media-playback device 102. The user interface 112 includes a control element 602 for displaying a list of existing playlists and receiving a user input of selecting one or more of the existing playlists, as described in FIG. 9. The user interface 112 further includes a control element 604 for receiving a user input of creating a new playlist, as described in FIG. 9. FIG. 20 illustrates another example of the user interface 112. In this example, the user interface 112 includes a control element 606 for receiving a user input of retrieving or uploading an existing playlist, and a control element 608 for receiving a user input for creating a new playlist.

FIG. 21 illustrates an example of the user interface 112 showing an example media playlist interface 118 and an example recommendation interface 120, as shown in FIG. 1.

The media playlist interface 118 shows a list of media content items (i.e., songs in this example) that are included in a seed playlist 130. In the illustrated example, the seed playlist 130 is named "soft rock" and two songs are included in the seed playlist 130.

The recommendation interface 120 shows the recommended media content items 474 generated based on the attributes of the seed playlist 130, such as the playlist title, the tracks, and the artists in the seed playlist 130. In some embodiments, the recommendation interface 120 displays all of the recommended media content items 474 in a single list, which is scrollable in the display screen. In other embodiments, the recommendation interface 120 is configured to show only a predetermined number of recommended media content items 474 (e.g., a batch or subset of recommended media content items) at a time. In the illustrated example, six (6) recommended songs are displayed in the recommendation interface 120. In some embodiments, the recommendation interface 120 has a control button 610 (e.g., "REFRESH") to retrieve and show another batch or subset of recommended media content items.

In some embodiments, the recommendation interface 120 includes a control element 612 associated with each recommended media content item and configured to add the recommendation media content item to the seed playlist 130. In addition, or alternatively, the recommended media content items can be added to the seed playlist by drag and drop.

In some embodiments, once a recommended media content item is moved from the list to the seed playlist 130, another media content item can be added to the list or batch of media content items in the display screen. In other embodiments, when a recommended media content item is moved from the list to the seed playlist 130, that item is removed from the list and is not replaced by any other item.

The recommendation interface 120 can include a control element 614 for playing back, or previewing, an associated media content item which is not added to the seed playlist 130.

Referring to FIGS. 22-31, example results of recommended media content items 474 are described based on different types of seed playlist 130. In these results, the media content items are music tracks or songs, and the playlists are music playlists.

In particular, FIGS. 22-25 illustrate example recommendations of media content items 474 where the seed playlist 130 only has a playlist title 420 without tracks 422, such as the type of seed playlist as described in FIG. 11.

In the examples of FIGS. 22-24, the playlist titles 420 are descriptive to represent the characteristic of the seed playlist 130, while there is no seed track 434. In FIG. 22, the seed playlist title is "70s Disco" and the recommended songs 474 are selected based on the seed playlist title. In FIG. 23, the seed playlist title is "Italian Dinner" and the recommended songs 474 are selected based on the seed playlist title. In FIG. 24, the seed playlist title is "Break up" and the recommended songs 474 are selected based on the seed playlist title.

In FIG. 25, the playlist title 420 has a generic name which does not represent the characteristic of the seed playlist 130. In the illustrated example, the seed playlist title is "Music" and popular songs are selected as the recommended songs 474. In other embodiments, where the seed playlist 130 is named a generic title without seed tracks, the recommended songs 474 can be selected in other ways than popularity. As such, the method of the present disclosure encourages users to create a playlist with a better description of playlist title to receive recommendations that are better suited to the user.

FIGS. 26-28 illustrate example recommendations of media content items 474 where the seed playlist 130 has a generic playlist title 420 and only a limited number of seed tracks 422, such as the type of seed playlist as described in FIG. 10. Because the seed playlist title 432 does not represent the characteristic of the seed playlist 130, only the seed tracks 422 functions as the attribute of the seed playlist 130. In this configuration, in some embodiments, the recommendations of media content items are generated to fit a theme of the seed tracks.

In the example of FIG. 26, the seed playlist 130 has a playlist title of "playlist" and three seed tracks: (1) Disturbia by Rhianna, (2) Werewolves of London by Warren Zevon, and (3) Thriller by Michael Jackson. In one possible embodiment, these seed tracks are determined to have a theme of Halloween pop songs. Then, the recommendations of songs 474 are generated based on the theme of Halloween pop songs.

In the example of FIG. 27, the seed playlist 130 has a playlist title of "playlist" and three seed tracks: (1) All along the watchtower by Jimi Hendrix, (2) Pieces of my heart by Janis Joplin, and (3) White Rabbit by Jefferson airplane. In one possible embodiment, these seed tracks are determined to have a theme of psychedelia in the 1960s. Then, the recommendations of songs 474 are generated based on the theme of the 60s psychedelia.

In the example of FIG. 28, the seed playlist 130 has a playlist title of "playlist" and three seed tracks: (1) War Pigs by Cake, (2) Such Great Heights by Iron & Wine, and (3) Come on Eileen by Save Ferris. In one possible embodiment, these seed tracks are determined to have a theme of cover songs. Then, the recommendations of songs 474 are generated based on the theme of cover songs.

FIGS. 29-31 illustrate example recommendations of media content items 474 where the seed playlist 130 has a descriptive playlist title 420 and a sufficient number of seed tracks 422, such as the type of seed playlist as described in FIG. 10. In these examples, both the seed playlist title and the seed tracks (including track titles and artist names) can be used as the attributes of the seed playlist 130.

In the example of FIG. 29, the seed playlist 130 has a playlist title of "Your Favorite Coffeehouse" and 50 or more seed tracks. The recommended songs 474 are selected based on the seed playlist title and the attributes of the seed tracks. In the example of FIG. 30, the seed playlist 130 has a playlist title of "Acoustic Covers" and 50 or more seed tracks. The recommended songs 474 are selected based on the seed playlist title and the attributes of the seed tracks. In the example of FIG. 31, the seed playlist 130 has a playlist title of "Metal Goddesses" and 50 or more seed tracks. The recommended songs 474 are selected based on the seed playlist title and the attributes of the seed tracks.

As such, the media content item recommendation system of the present disclosure can use a playlist title as a description of media content items that the user wants to add in the playlist. A list of recommended media content items is then provided based at least on the playlist title, and the user can select one or more media content items from the list and add them to the playlist. The recommendation system of the present disclosure operates to recommend media content items that are better suited to the user as the user creates a playlist with a better description. Therefore, the recommendation method system of the present disclosure can work as an incentive or motivation for users to use specific playlist descriptions, such as titles, for improving recommendation of media content items.

The media content item recommendation system of the present disclosure provides a customer-facing playlist extension feature. Playlists are important features for many media content service providers. Users with more playlists are more likely to be committed customers of the media content service providers. However, for many users, creating a playlist can be challenging. Only a small portion of all user-created playlists consist of no tracks or only a few tracks. The recommendation system of the present disclosure provides a user-friendly tool to create playlists with media content items that the users want to have. The system makes it easier for a user to create a playlist by providing track recommendations for a playlist as the user is creating it.

The recommendation system generates track recommendations based on minimal user input. For example, a new playlist with just a little bit of content, such as a title and a few tracks, can be used to generate relevant recommendations. The system further generates better recommendations with more user inputs. For example, the recommendation system can generate better recommendations based on a longer list of tracks in the playlist.

The recommendation system can capture the essence of the playlist as a whole by recognizing common attributes about tracks that are already in the playlist and generating recommendations that fit with those common attributes. For example, if the seed playlist has 3 tracks and all three are acoustic covers, the bulk of the track recommendations should be acoustic covers.

A user repeatedly asks for more recommendations for a playlist. At each iteration, some of the recommendations may be added by the user to the playlist, and some are ignored. As the user grows the playlist, the recommender should adapt the recommendations based upon the tracks that are being added to the playlist or ignored by the user.

The recommendation system can takes advantage of the millions of playlists generated by users to generate relevant track recommendations for playlists. Given a seed playlist, the system finds the set of most similar user-generated playlists to that seed. Similarity is determined based upon overlapping tracks, artists and playlist title. In one possible embodiment, tracks from these similar playlists are aggregated and the tracks that occur most frequently across all of the similar playlists are surfaced as recommendations. An alternate scoring scheme surfaces up distinctive tracks from among the set of similar playlists. This can help reduce popularity bias.

The various examples and teachings described above are provided by way of illustration only and should not be construed to limit the scope of the present disclosure. Those skilled in the art will readily recognize various modifications and changes that may be made without following the examples and applications illustrated and described herein, and without departing from the true spirit and scope of the present disclosure.

What is claimed is:

1. A method comprising:
generating a user interface on a computing device, the user interface including a playlist section that presents a playlist;
tracking how many times media content items having one or more particular attributes have been recommended to a user for playlist inclusion and, responsive to being recommended to the user for playlist inclusion, have not been selected by the user for playlist inclusion;
based on the tracking, establishing a score for the one or more particular attributes; and
using the established score as a basis to control what media content items to present in the user interface as a set of recommended media content items for addition to the playlist.

2. The method of claim 1, wherein tracking how many times media content items having one or more particular attributes have been recommended to the user for playlist inclusion and, responsive to being recommended to the user for playlist inclusion, have not been selected by the user for playlist inclusion comprises:
tracking how many times media content items having the one or more particular attributes have been presented to the user in different lists of recommended media content and have been ignored by the user.

3. The method of claim 1, wherein the one or more particular attributes includes an artist attribute.

4. The method of claim 3, wherein the artist attribute is obtained from an artist name associated with an artist.

5. The method of claim 1, wherein using the established score as a basis to control what media content items to present in the user interface as the set of recommended media content items for addition to the playlist comprises:
using the established score as a basis to adjust a likelihood of including, in the set of recommended media content items, media content items that have the one or more particular attributes.

6. The method of claim 1, further comprising enabling the user to preview the set of recommended media content items.

7. The method of claim 1, further comprising receiving an input from the user via a control element to play back or preview media content not selected by the user for playlist inclusion.

8. The method of claim 1, further comprising automatically updating the set of recommended media content items to include media content items having one or more given attributes when a user playback frequency associated with the one or more given attributes is above a threshold value.

9. A system for controlling recommendation of media content items for addition to a playlist, the system comprising:
one or more processors; and
non-transitory computer readable storage having stored thereon instructions that, when executed by the one or more processors, cause the system to carry out operations including:
generating a user interface on a computing device, the user interface including a playlist section that presents a playlist,
tracking how many times media content items having one or more particular attributes have been recommended to a user for playlist inclusion and, responsive to being recommended to the user for playlist inclusion, have not been selected by the user for playlist inclusion,
based on the tracking, establishing a score for the one or more particular attributes, and
using the established score as a basis to control what media content items to present in the user interface as a set of recommended media content items for addition to the playlist.

10. The system of claim 9, wherein tracking how many times media content items having one or more particular attributes have been recommended to the user for playlist inclusion and, responsive to being recommended to the user for playlist inclusion, have not been selected by the user for playlist inclusion comprises:
tracking how many times media content items having the one or more particular attributes have been presented to the user in different lists of recommended media content and have been ignored by the user.

11. The system of claim 9, wherein the one or more particular attributes includes an artist attribute.

12. The system of claim 11, wherein the artist attribute is obtained from an artist name associated with an artist.

13. The system of claim 9, wherein using the established score as a basis to control what media content items to present in the user interface as a set of recommended media content items for addition to the playlist comprises:
using the established score as a basis to adjust a likelihood of including, in the set of recommended media content items, media content items that have the one or more particular attributes.

14. The system of claim 9, wherein the operations additionally include enabling the user to preview the set of recommended media content items.

15. The system of claim 9, wherein the operations additionally include receiving an input from the user via a control element to play back or preview media content not selected by the user for playlist inclusion.

16. The system of claim 9, wherein the operations additionally include automatically updating the set of recommended media content items to include media content items having one or more given attributes when a user playback frequency associated with the one or more given attributes is above a threshold value.

17. Non-transitory computer-readable storage having stored thereon instructions that, when executed by one or more processors cause execution of operations comprising:
generating a user interface on a computing device, the user interface including a playlist section that presents a playlist;
tracking how many times media content items having one or more particular attributes have been recommended to a user for playlist inclusion and, responsive to being recommended to the user for playlist inclusion, have not been selected by the user for playlist inclusion;
based on the tracking, establishing a score for the one or more particular attributes; and
using the established score as a basis to control what media content items to present in the user interface as a set of recommended media content items for addition to the playlist.

18. The non-transitory computer-readable storage of claim 17, wherein tracking how many times media content items having one or more particular attributes have been recommended to the user for playlist inclusion and, responsive to being recommended to the user for playlist inclusion, have not been selected by the user for playlist inclusion comprises:

tracking how many times media content items having the one or more particular attributes have been presented to the user in different lists of recommended media content and have been ignored by the user.

19. The non-transitory computer-readable storage of claim 17, wherein the one or more particular attributes includes an artist attribute.

20. The non-transitory computer-readable storage of claim 17, wherein using the established score as a basis to control what media content items to present in the user interface as a set of recommended media content items for addition to the playlist comprises:

using the established score as a basis to adjust a likelihood of including, in the set of recommended media content items, media content items that have the one or more particular attributes.

* * * * *